(12) United States Patent
Takeda et al.

(10) Patent No.: US 11,063,736 B2
(45) Date of Patent: Jul. 13, 2021

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/072,918

(22) PCT Filed: Jan. 25, 2017

(86) PCT No.: PCT/JP2017/002424
§ 371 (c)(1),
(2) Date: Jul. 26, 2018

(87) PCT Pub. No.: WO2017/130991
PCT Pub. Date: Aug. 3, 2017

(65) Prior Publication Data
US 2019/0036676 A1 Jan. 31, 2019

(30) Foreign Application Priority Data
Jan. 27, 2016 (JP) .............................. JP2016-013685

(51) Int. Cl.
*H04L 5/14* (2006.01)
*H04W 72/04* (2009.01)
(Continued)

(52) U.S. Cl.
CPC .......... *H04L 5/1469* (2013.01); *H04L 1/1812* (2013.01); *H04W 72/04* (2013.01);
(Continued)

(58) Field of Classification Search
None
See application file for complete search history.

(56) References Cited

U.S. PATENT DOCUMENTS

| 9,722,737 B2 * | 8/2017 | Fu ......................... H04L 1/1607 |
| 2012/0120909 A1 * | 5/2012 | Ng ......................... H04W 72/14 370/329 |

(Continued)

FOREIGN PATENT DOCUMENTS

| JP | 2015-510338 A | 4/2015 |
| JP | 2016-006980 A | 1/2016 |

(Continued)

OTHER PUBLICATIONS

International Search Report issued in PCT/JP2017/002424 dated Mar. 21, 2017 (1 page).

(Continued)

*Primary Examiner* — Jutai Kao
(74) *Attorney, Agent, or Firm* — Osha Bergman Watanabe & Burton LLP

(57) ABSTRACT

An object is to provide proper communication even with a shortened TTI. Provided is a user terminal that communicates with a plurality of carriers including a TDD carrier using a shortened TTI having a transmission time interval (TTI) length of less than 1 ms. The user terminal includes: a receiving unit that receives DL signals transmitted from a radio base station; and a control unit that controls transmission of UL signals related to the DL signals. The control unit operates such that at least one of the UL signals related to the DL signals transmitted every TTI of the TDD carrier is transmitted through another carrier in a predetermined period.

9 Claims, 20 Drawing Sheets

CC#2 WITH SHORTENTED TTI

CC#1 WITH NORMAL TTI

1 SUBFRAME

(51) Int. Cl.
*H04W 72/12* (2009.01)
*H04W 76/27* (2018.01)
*H04L 1/18* (2006.01)
*H04L 5/00* (2006.01)

(52) U.S. Cl.
CPC ... *H04W 72/0406* (2013.01); *H04W 72/0446* (2013.01); *H04W 72/0453* (2013.01); *H04W 72/12* (2013.01); *H04W 72/1263* (2013.01); *H04W 76/27* (2018.02); *H04L 5/001* (2013.01)

(56) References Cited

U.S. PATENT DOCUMENTS

| | | |
|---|---|---|
| 2013/0195002 A1 | 8/2013 | Walker et al. |
| 2015/0296533 A1* | 10/2015 | Park ............... H04B 7/208 370/329 |
| 2015/0327263 A1* | 11/2015 | Chen ............... H04W 72/0446 370/280 |
| 2015/0334702 A1* | 11/2015 | Ji ............... H04W 72/1257 370/280 |
| 2016/0374082 A1 | 12/2016 | Nguyen et al. |
| 2017/0048055 A1* | 2/2017 | Fu ............... H04L 1/1854 |
| 2017/0290008 A1* | 10/2017 | Tooher ............... H04L 1/0007 |
| 2020/0015248 A1 | 1/2020 | Ji et al. |
| 2020/0328850 A1* | 10/2020 | Feng ............... H04L 1/1812 |

FOREIGN PATENT DOCUMENTS

| | | |
|---|---|---|
| WO | 2015/179144 A1 | 11/2015 |
| WO | 2015/179145 A1 | 11/2015 |
| WO | 2015/179146 A1 | 11/2015 |

OTHER PUBLICATIONS

Written Opinion of the International Searching Authority issued in PCT/JP2017/002424 dated Mar. 21, 2017 (3 pages).
NTT Docomo; "On the need of PUCCH on multiple UL serving cells for TDD-FDD CA"; 3GPP TSG RAN WG1 Meeting #75, R1-135513; San Francisco, USA; Nov. 11-15, 2013 (9 pages).
ETRI; "Discussion on TTI shortening"; 3GPP TSG RAN WG1 Meeting #83, R1-157110; Anaheim, USA; Nov. 16-20, 2015 (7 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in European Application No. 17744221.7, dated Jul. 1, 2019 (6 pages).
"Discussion for Corrections on different TDD UL/DL configurations on different bands"; TSG-RAN WG1 Meeting #72bis, R1-131379; Chicago, USA; Apr. 15-19, 2013 (8 pages).
Office Action issued in the counterpart Japanese Patent Application No. 2017-564283, dated Oct. 20, 2020 (4 pages).
Office Action issued in European Application No. 17744221.7; dated Jan. 12, 2021 (5 pages).
Office Action issued in the counterpart Japanese Patent Application No: 2017-564283, dated Apr. 20, 2021 (6 pages).

* cited by examiner

| UL-DL config | switch-period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 5

| Sp-SF Config | Normal CP in DL | | | Extended CP in DL | | |
|---|---|---|---|---|---|---|
| | DwPTS | UpPTS Normal CP in UL | UpPTS Extended CP in UL | DwPTS | UpPTS Normal CP in UL | UpPTS Extended CP in UL |
| 0 | 3 | | | 3 | | |
| 1 | 9 | 1 | 1 | 8 | 1 | 2 |
| 2 | 10 | | | 9 | | |
| 3 | 11 | | | 10 | | |
| 4 | 12 | | | 3 | 2 | 2 |
| 5 | 3 | 2 | 2 | 8 | | |
| 6 | 9 | | | 9 | | |
| 7 | 10 | | | 5 | | |
| 8 | 11 | – | – | – | – | – |
| 9 | 6 | – | – | – | – | – |

FIG. 6

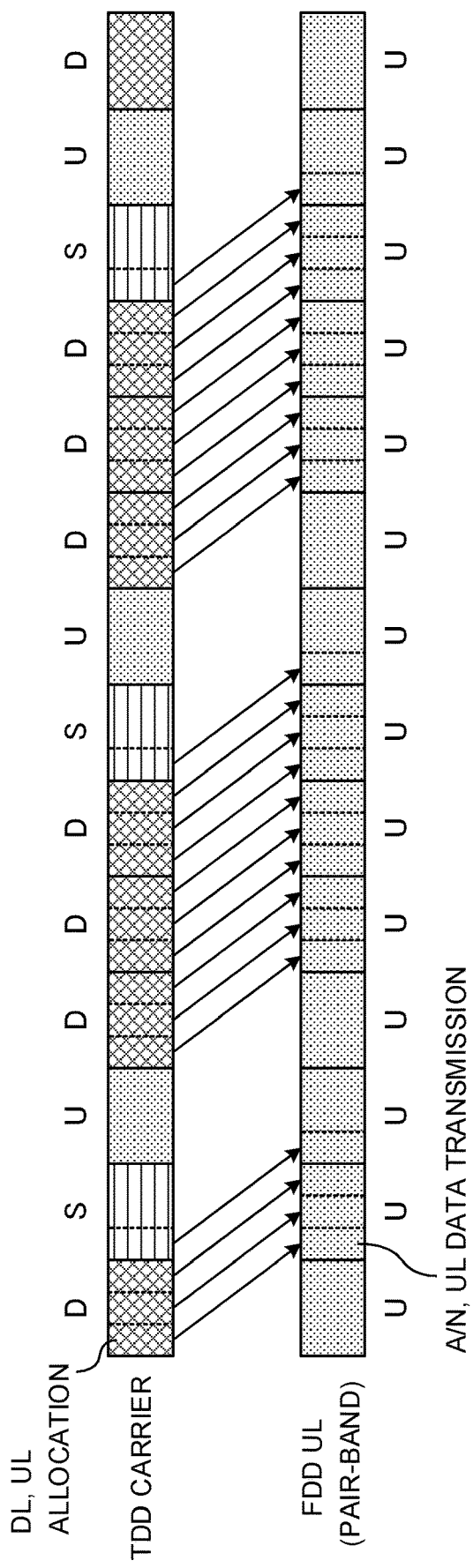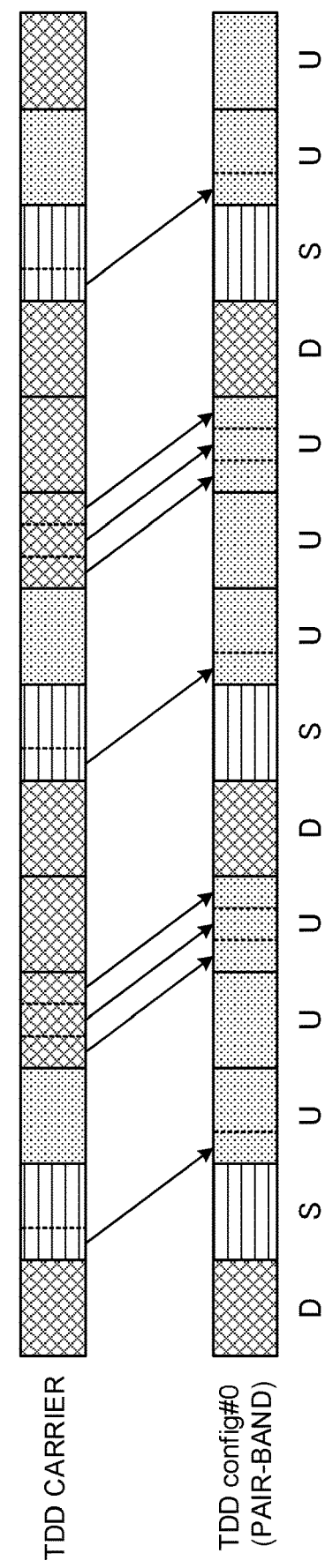

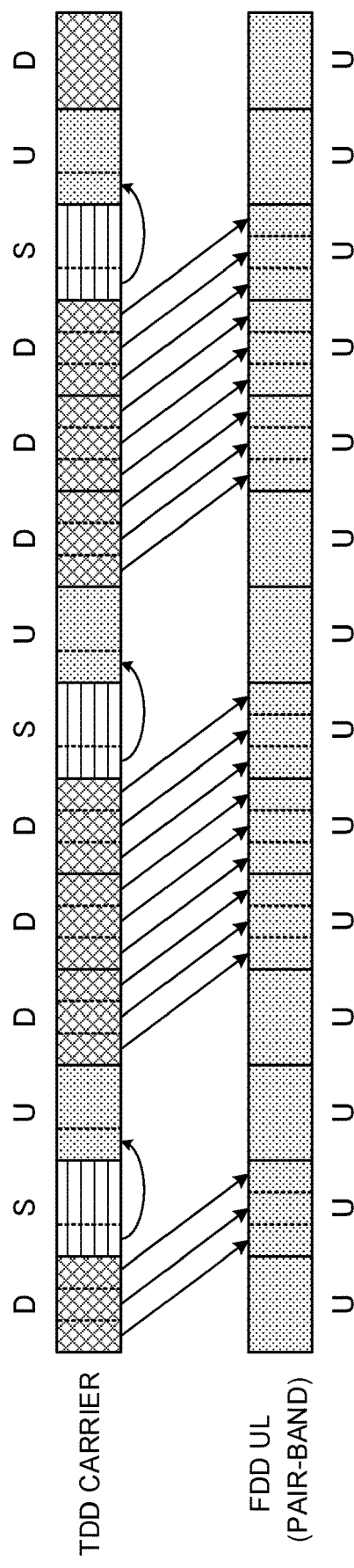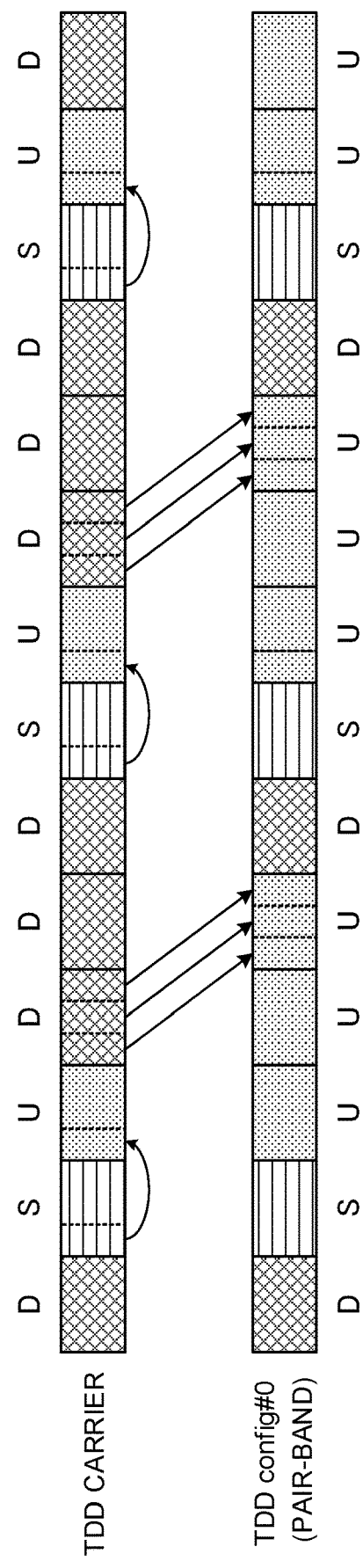

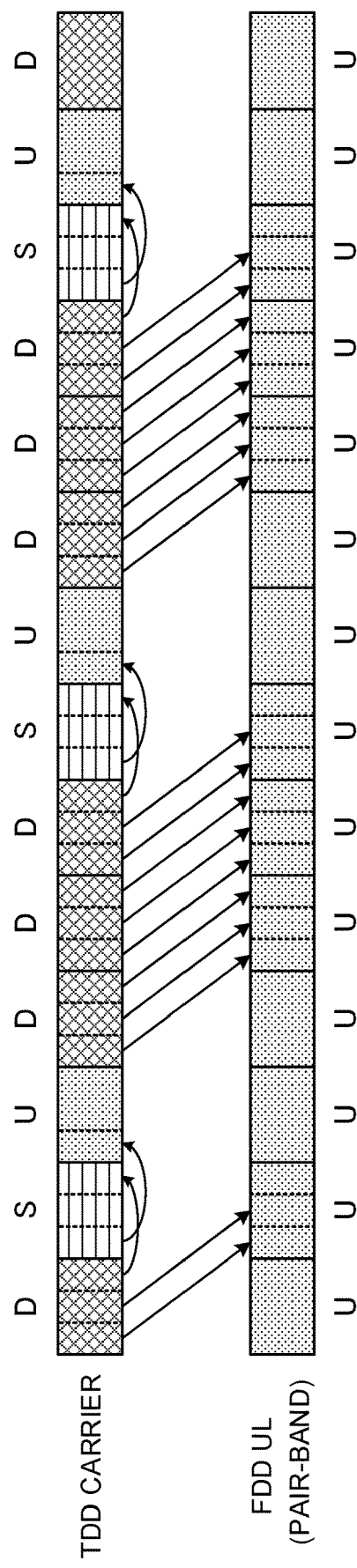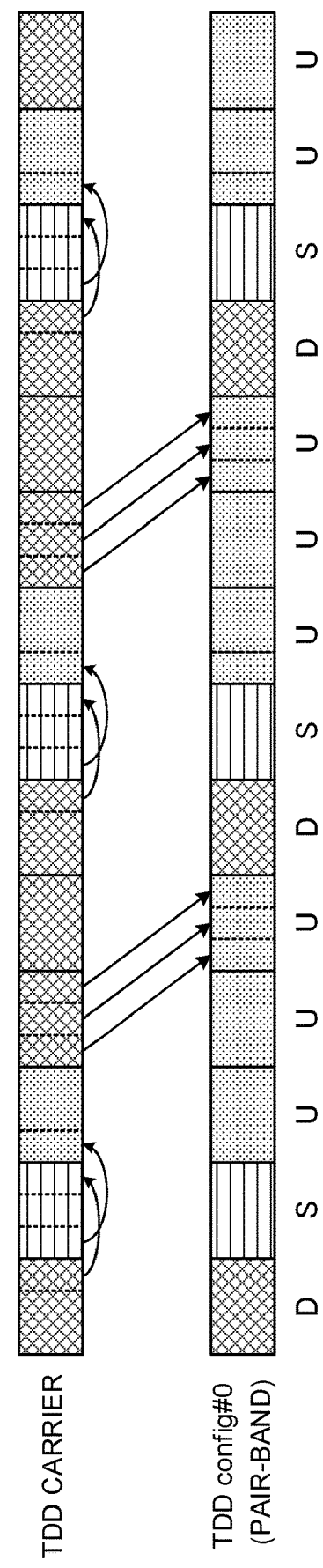

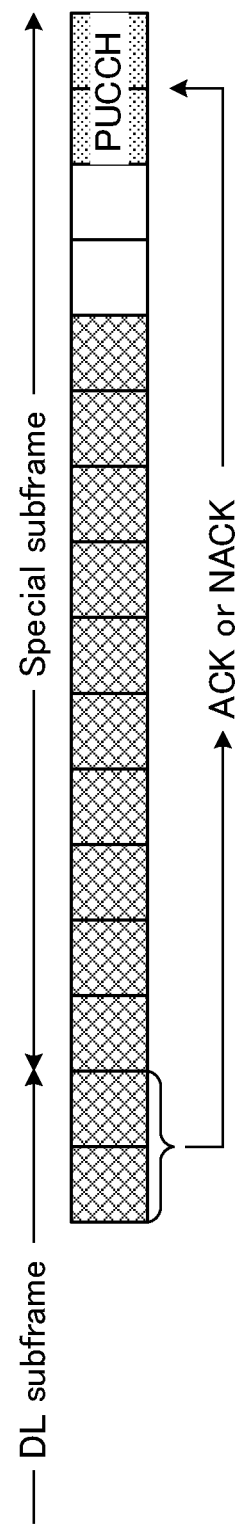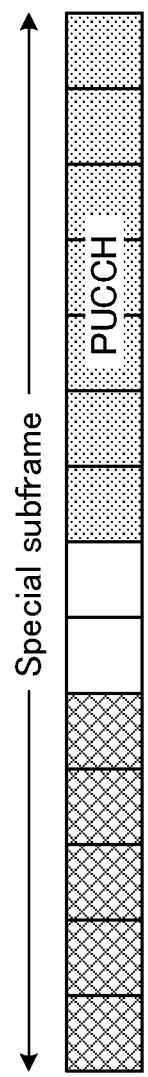
FIG. 11A
FIG. 11B

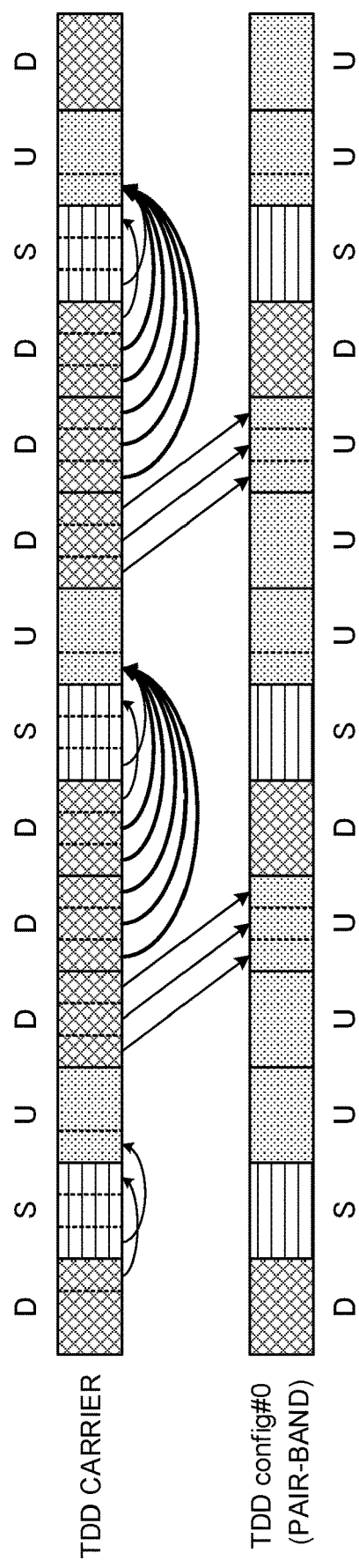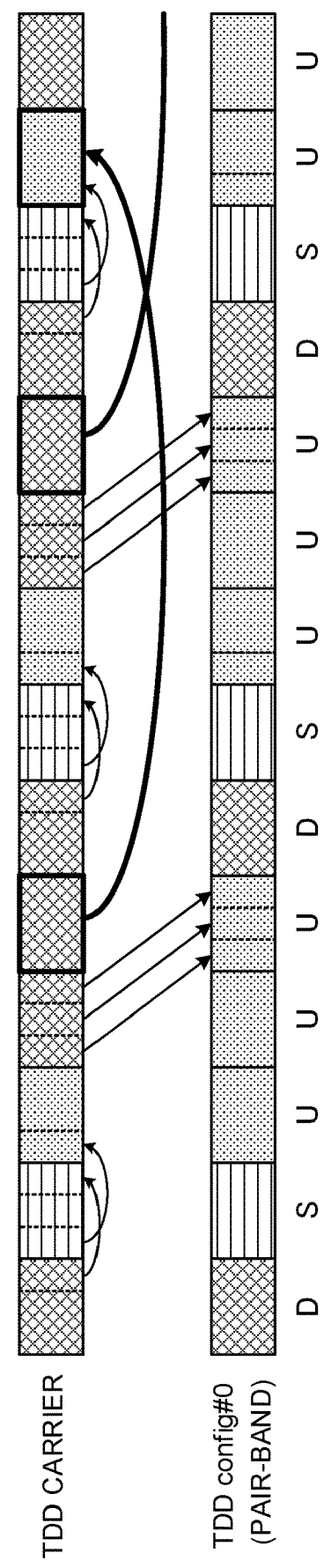

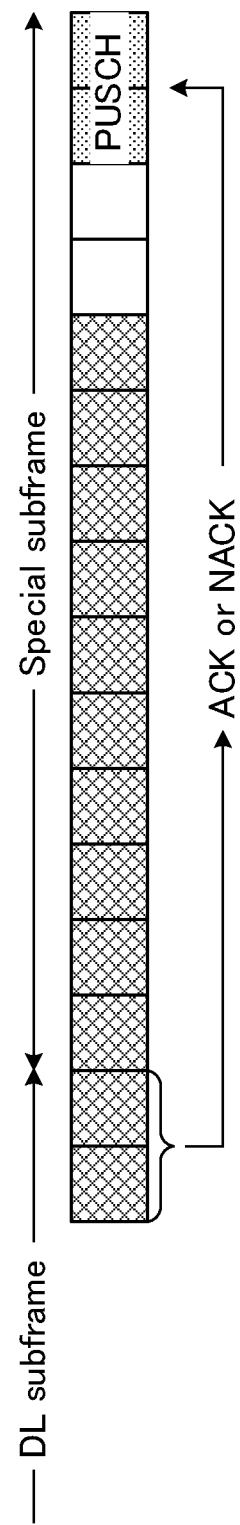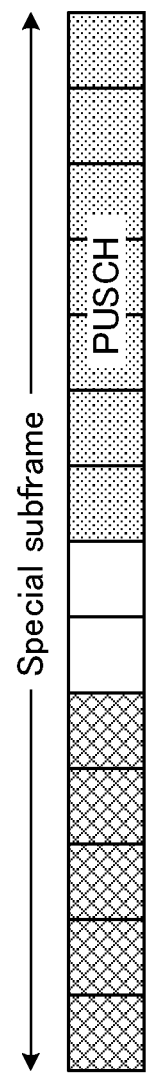
FIG. 13A
FIG. 13B

USER TERMINAL, RADIO BASE STATION, AND RADIO COMMUNICATION METHOD

TECHNICAL FIELD

The present invention relates to a user terminal, a radio base station, and a radio communication method for a next-generation mobile communication system.

BACKGROUND ART

For the universal mobile telecommunication system (UMTS) network, the long-term evolution (LTE) has been specified for further enhanced data rates and lower delay (see Non-Patent Literature 1). The LTE advanced (also referred to as LTE Rel.10, 11, or 12) has been specified for achieving even wider bands and higher speed than those of LTE (LTE Rel.8 or later), and the succeeding systems (also referred to as LTE Rel.13, for example) are under study.

The LTE Rel.10/11 employs carrier aggregation (CA) which aggregates multiple component carrier (CCs) to expand the frequency band. Each CC uses an LTE Rel.8 system band as one unit. In CA, a plurality of CCs associated with the same radio base station (eNodeB (eNB)) is allocated to each user terminal (UE: User Equipment).

Meanwhile, LTE Rel.12 also employs dual connectivity (DC) in which multiple cell groups (CGs) associated with different radio base stations are allocated to each user terminal. Each cell group consists of at least one cell (CC). DC, which aggregates multiple CCs associated with different radio base stations, is also called "Inter-eNB CA".

Existing systems (LTE Rel.8-12) use frequency division duplex (FDD) in which downlink (DL) transmission and uplink (UL) transmission are performed in different frequency bands, and time division duplex (TDD) in which DL transmission and UL transmission are performed in the same frequency band but in different periods. For example, TDD strictly defines whether each subframe is used for uplink (UL) or downlink (DL), depending on the UL/DL configuration.

In such existing systems, a transmission time interval (TTI) in DL transmission and UL transmission between a radio base station and a user terminal is set to 1 ms under control. A transmission time interval is also referred to as a transport time interval. A TTI in LTE systems (Rel.8-12) is also referred to as a subframe length.

CITATION LIST

Non-Patent Literature

Non-Patent Literature 1

3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Radio communication systems (e.g., 5G) according to LTE Rel.13 or later assume communication in high frequency bands of several tens of gigahertz and relatively low data communication, such as internet of things (IoT), machine type communication (MTC), and machine to machine (M2M). Device to device (D2D) communication and vehicular to vehicular (V2V) communication which require low delay communication are also now in increasing demand.

Such future radio communication systems aim at latency reduction to provide sufficient communication service. For example, they assume communication using the minimum time unit of scheduling called a transmission time interval (TTI) 1 ms faster than that in existing LTE systems (LTE Rel.8-12) (which may be referred to as shortened TTI, for example).

In existing LTE systems, which perform communication timing control subframe (1 ms) by subframe, the timing control method matters in communication using shortened TTIs. In particular, transmission timings for a cell using TDD (also referred to as CC or TDD carrier) are controlled based on UL/DL configurations each defining 1-ms-long UL subframes and DL subframes. For this reason, in use of a shortened TTI for TDD carriers, what matters is how to control transmission timings for communication.

An object of the present invention, which has been made to solve this problem, is to provide a user terminal, a radio base station, and a radio communication method that provide proper communication even with a shortened TTI.

Solution to Problem

One embodiment of a user terminal of the present invention communicates with a plurality of carriers including a TDD carrier using a shortened TTI having a transmission time interval (TTI) length of less than 1 ms. The user terminal includes: a receiving unit that receives DL signals transmitted from a radio base station; and a control unit that controls transmission of UL signals related to the DL signals. The control unit operates such that at least one of the UL signals related to the DL signals transmitted every TTI of the TDD carrier is transmitted through another carrier in a predetermined period.

Advantageous Effects of Invention

The present invention provides proper communication even with a shortened TTI.

BRIEF DESCRIPTION OF DRAWINGS

FIG. 5 is a diagram for explaining a UL/DL configuration with TDD.

FIG. 6 is a diagram for explaining a special subframe configuration with TDD.

FIGS. 8A and 8B show an example of UL transmission control according to this embodiment.

FIGS. 9A and 9B show another example of UL transmission control according to this embodiment.

FIGS. 10A and 10B show another example of UL transmission control according to this embodiment.

FIGS. 11A and 11B show an example of a special subframe configuration according to this embodiment.

FIGS. 12A and 12B show another example of UL transmission control according to this embodiment.

FIGS. 13A and 13B show another example of a special subframe configuration according to this embodiment.

DESCRIPTION OF EMBODIMENTS

Figure 1:
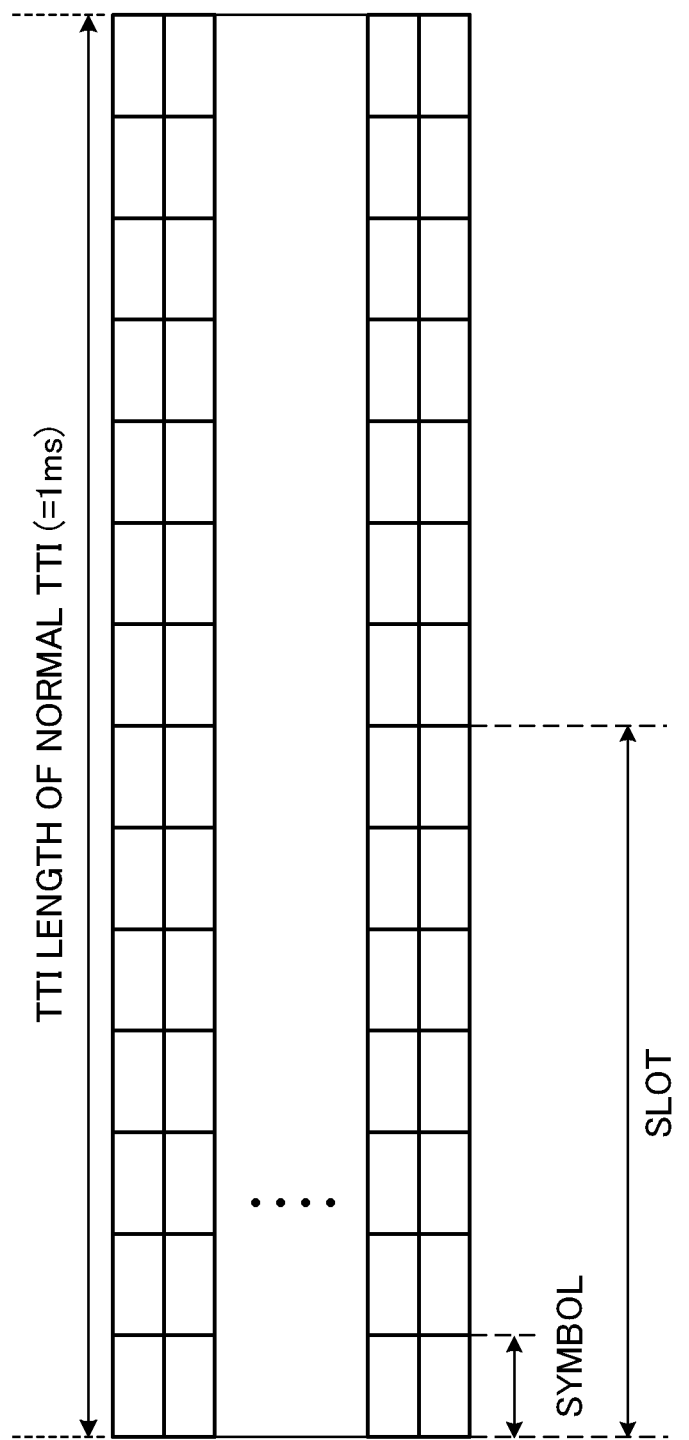
FIG. 1 is a diagram showing an example of a transmission time interval (TTI) according to existing LTE systems (Rel.8-12).

FIG. 1 is a diagram showing an example of a transmission time interval (TTI) according to existing systems (LTE Rel.8-12). As shown in FIG. 1, a TTI (hereinafter referred to as "normal TTI") according to LTE Rel.8-12 has a time length of 1 ms. A normal TTI, which is also referred to as a subframe, consists of two time slots. A TTI is a transmission time unit of one data packet (transport block) after channel coding, and is used as a unit for processing, such as scheduling and link adaptation.

As shown in FIG. 1, for downlink (DL) with normal cyclic prefix (CP), a normal TTI consists of 14 orthogonal frequency division multiplexing (OFDM) symbols (seven OFDM symbols per slot). Each OFDM symbol has a time length (symbol length) of 66.7 μs with a normal CP of 4.76 μs added to it. Since the symbol length and the sub-carrier spacing are reciprocal, if the symbol length is 66.7 μs, the sub-carrier spacing is 15 kHz.

For uplink (UL) with normal cyclic prefix (CP), a normal TTI consists of 14 single carrier frequency division multiple access (SC-FDMA) symbols (seven SC-FDMA symbols per slot). Each SC-FDMA symbol has a time length (symbol length) of 66.7 μs with a normal CP of 4.76 μs added to it. Since the symbol length and the sub-carrier spacing are reciprocal of each other, if the symbol length is 66.7 μs, the sub-carrier spacing is 15 kHz.

In the case of extended CP, a normal TTI may consist of 12 OFDM symbols (or 12 SC-FDMA symbols). In this case, each OFDM symbol (or each SC-FDMA symbol) has a time length of 66.7 μs with an extended CP of 16.67 μs added to it.

Meanwhile, radio communication systems (e.g., LTE and 5G) according to LTE Rel.13 or later require wireless (radio) interfaces suitable for high frequency bands of several tens of gigahertz and radio interfaces with minimized delay intended for internet of things (IoT), machine type communication (MTC), machine to machine (M2M), device to device (D2D), and vehicular to vehicular (V2V) services.

Figure 2:
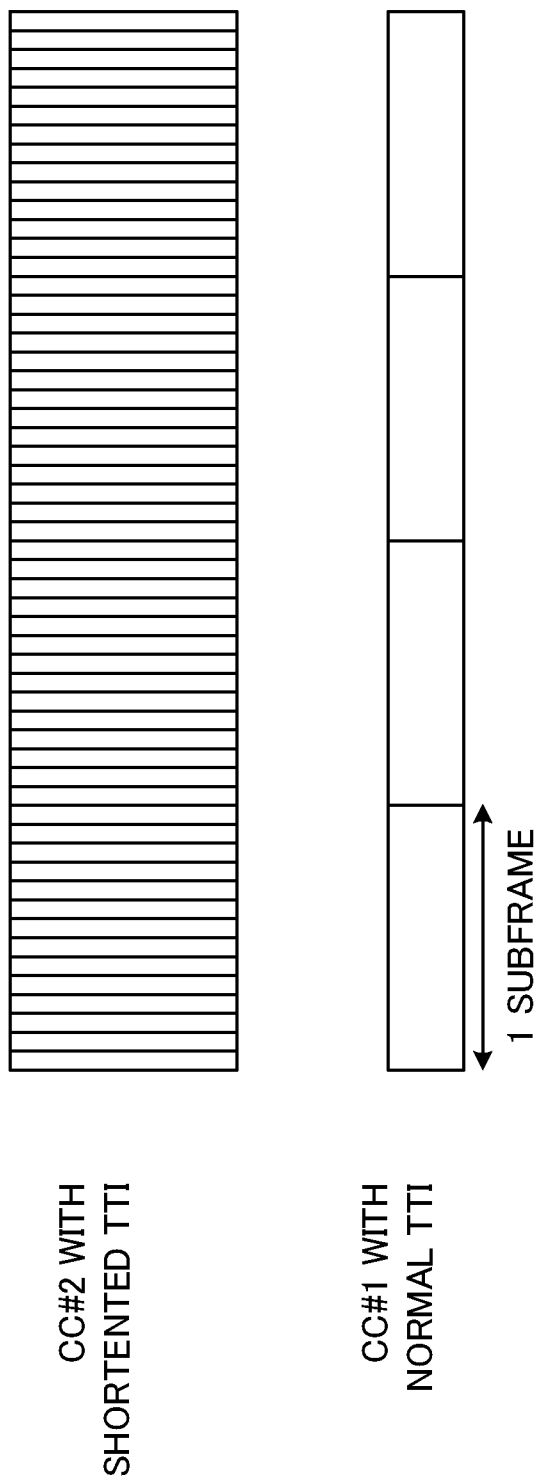
FIG. 2 is a diagram for explaining a normal TTI and a shortened TTI.

For this reason, it is assumed that future communication systems use a shortened TTI which is 1 ms shorter than a TTI for communication (see FIG. 2). FIG. 2 shows a cell (CC #1) using a normal TTI (1 ms) and a cell (CC #2) using a shortened TTI. To use a shortened TTI, the sub-carrier spacing should be changed from that for the normal TTI (for example, the sub-carrier spacing should be increased).

The use of a TTI that has a shorter time length than a normal TTI (hereinafter referred to as "shortened TTI") increases the time margin for processing in a user terminal and radio base stations (e.g., coding and decoding), thereby reducing processing delay. The use of a shortened TTI can increase the number of user terminals that can be contained per time unit (e.g., 1 ms). The configuration of a shortened TTI will be described below.

(Example Configuration of Shortened TTI)

An example configuration of a shortened TTI will now be described with reference to FIG. 3. As shown in FIGS. 3A and 3B, a shortened TTI has a time length (TTI length) of less than 1 ms. A shortened TTI may consist of one or more TTI lengths of, for example, 0.5 ms, 0.25 ms, 0.2 ms, 0.1 ms, and other values the multiples of which are 1 ms. Alternatively, since a normal TTI with a normal CP has 14 symbols, it may consist of one or more TTI lengths of $7/14$ ms, $4/14$ ms, $3/14$ ms, $1/14$ ms, and other integral multiples of $1/14$ ms. Alternatively, since a normal TTI with an extended CP has 12 symbols, it may consist of one or more TTI lengths of $6/12$ ms, $4/12$ ms, $3/12$ ms, $1/12$ ms, and other integral multiples of $1/12$ ms. Like in conventional LTE, even with a shortened TTI, a normal CP or an extended CP is configured with the use of broadcast information and higher-layer signaling, such as RRC signaling. This allows a shortened TTI to be used while keeping compatibility (synchronization) with a 1-ms-long normal TTI.

Figure 3A:
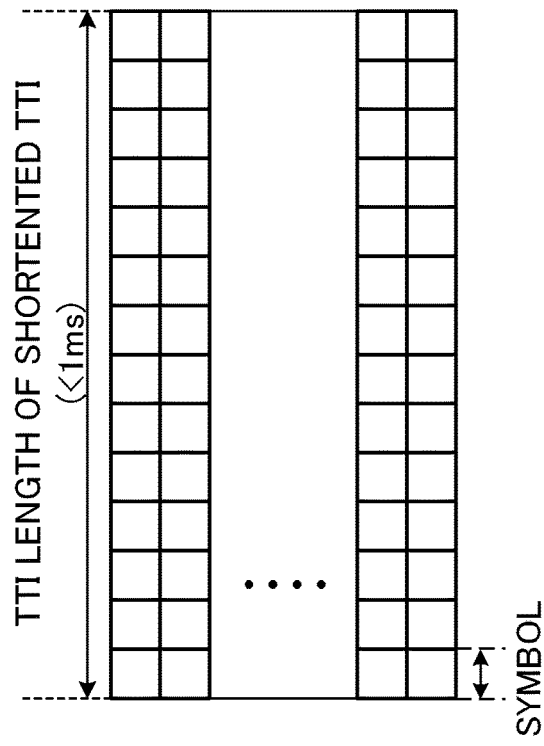
FIGS. 3A and 3B show examples of a shortened TTI.
Figure 3B:
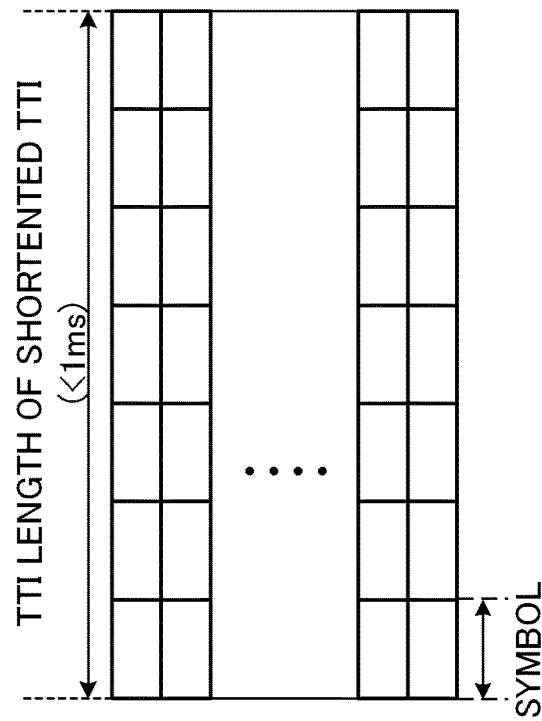

FIGS. 3A and 3B show the case of a normal CP, although this is illustrative only. A shortened TTI only has to be longer than a normal TTI independently of the number of symbols in the shortened TTI, the symbol length, the CP length, and other configurations. In addition, the description below is based on the case where DL uses OFDM symbols and UL uses SC-FDMA symbols, although this is illustrative only.

FIG. 3A shows a first example configuration of a shortened TTI. As shown in FIG. 3A, in the first example configuration, the shortened TTI consists of 14 OFDM symbols (or SC-FDMA symbols) which is the same number as that in a normal TTI, and the symbol length of each OFDM symbol (each SC-FDMA symbol) is shorter than that of a normal TTI (=66.7 μs).

When the symbol length is shortened with the same number of symbols for the normal TTI as shown in FIG. 3A, the physical layer signal configuration (e.g., RE arrangement) of the normal TTI can be used. In addition, if the number of symbols for the normal TTI remains unchanged, a shortened TTI can contain the same amount of information (bit count) as a normal TTI. Meanwhile, since the symbol time length is different from that of each symbol in a normal TTI, it is difficult to achieve frequency multiplexing of a signal of a shortened TTI, which is shown in FIG. 3A, and a signal of a normal TTI in the same system band (or cell or CC).

Since the symbol length and the sub-carrier spacing are reciprocal of each other, if the symbol length is shortened as shown in FIG. 3A, the sub-carrier spacing is greater than 15 kHz of a normal TTI. Extension of the sub-carrier spacing can effectively prevent channel to channel interference due to the Doppler shift caused by a moving user terminal, and degradation in transport quality due to phase noise in the receiver of the user terminal. Extension of the sub-carrier spacing is especially effective in preventing degradation in transport quality in high frequency bands of several tens of gigahertz.

FIG. 3B shows a second example configuration of a shortened TTI. As shown in FIG. 3B, in the second example configuration, the shortened TTI consists of a smaller number of OFDM symbols (or SC-FDMA symbols) than a normal TTI, and the symbol length of each OFDM symbol (each SC-FDMA symbol) is equal to that of a normal TTI (=66.7 μs). In this case, a shortened TTI can consist of the symbol units of a normal TTI. For example, a shortened TTI can consist of some of 14 symbols included in one subframe. In FIG. 3B, the shortened TTI consists of a half of the symbols of a normal TTI, i.e., seven OFDM symbols (SC-FDMA symbols).

As shown in FIG. 3B, when the same symbol length is maintained while the number of symbols is reduced, the amount of information contained in a shortened TTI (bit count) can be reduced from that in a normal TTI. Therefore, the user terminal can complete processing (e.g., demodulation and decoding) for receiving information in the shortened TTI with a shorter time than that needed for a normal TTI, thereby reducing processing delay. Further, a signal of a shortened TTI shown in FIG. 3B and a signal of a normal TTI can be subjected to frequency multiplexing in the same system band (or cell or CC), so that compatibility with the normal TTI can be maintained.

(Example of Shortened TTI Allocation)

An example of shortened TTI allocation will now be explained. In use of a shortened TTI, both a normal TTI and the shortened TTI may be allocated to the user terminal in order to provide compatibility with existing systems (LTE Rel.8-12). FIG. 4 shows an example of allocation of a normal TTI and shortened TTIs. It should be noted that FIG. 4 is illustrative only and these are not necessarily the cases.

Figure 4A:
FIGS. 4A to 4C show examples of a normal TTI and shortened TTIs.

FIG. 4A shows a first example of allocation of a shortened TTI. As shown in FIG. 4A, a normal TTI and a shortened TTI may temporally coexist in the same component carrier (CC) (frequency domain). To be specific, a shortened TTI may be allocated to particular subframes (or particular radio frames) in the same CC. For example, in FIG. 4A, a shortened TTI is allocated to a series of five subframes in the same CC, and normal TTIs are allocated to the other subframes. For example, examples of particular subframes include potential MBSFN subframes and subframes including (or excluding) particular signals, such as MIBs and synchronization channels. It should be noted that the number of subframes for shortened TTIs and their positions are not limited to those shown in FIG. 4A.

Figure 4B:
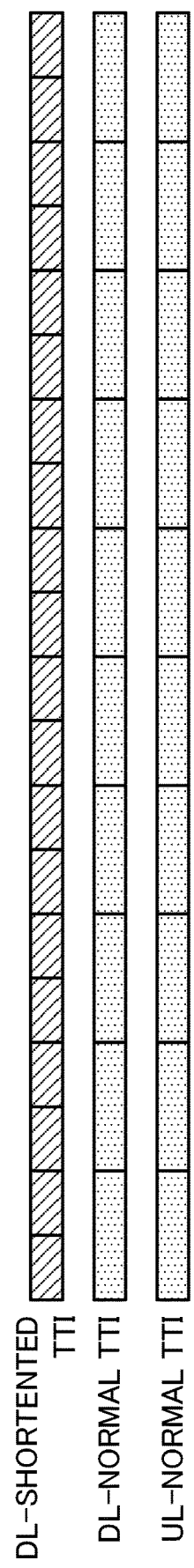

FIG. 4B shows a second example of allocation of a shortened TTI. As shown in FIG. 4B, a CC for a normal TTI and a CC for a shortened TTI may be combined for carrier aggregation (CA) or dual connectivity (DC). To be specific, a shortened TTI may be allocated to a particular CC (specifically, particular DL and/or UL CC). For example, in FIG. 4B, a shortened TTI is allocated to a particular DL CC, and normal TTIs are allocated to the other DL and UL CCs. It should be noted that the number of CCs for shortened TTIs and their positions are not limited to those shown in FIG. 4B.

In the case of CA, a shortened TTI may be allocated to particular CCs (primary (P) cells and/or secondary (S) cells) in the same radio base station. In the case of DC, a shortened TTI may be allocated to particular CCs (Pcells and/or Scells) in a master cell group (MCG) formed by a first radio base station, or particular CCs (primary secondary (PS) cells and/or Scells) in a secondary cell group (SCG) formed by a second radio base station.

Figure 4C:
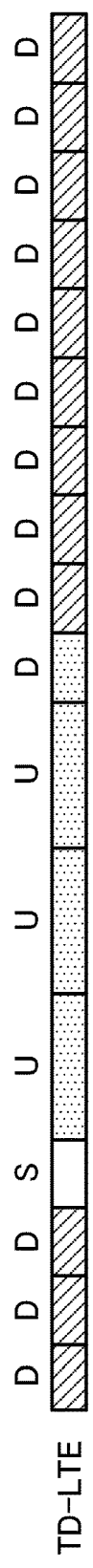

FIG. 4C shows a third example of allocation of a shortened TTI. As shown in FIG. 4C, a shortened TTI may be allocated to either DL or UL. For example, in FIG. 4C, in a TDD system, a normal TTI is allocated to UL, and a shortened TTI is allocated to DL.

In addition, a particular DL or UL channel and signal may be assigned (allocated) to a shortened TTI. For example, a physical uplink control channel (PUCCH) may be assigned to a normal TTI, and a physical uplink shared channel (PUSCH) may be assigned to a shortened TTI. In this case, for example, the user terminal may transmit the PUCCH through the normal TTI and the PUSCH through the shortened TTI.

Moreover, a multi-access scheme different from OFDM (or SC-FDMA), which is a multi-access scheme according to LTE Rel.8-12, may be assigned (allocated to) a shortened TTI.

(Example of Shortened TTI Notification)

As described above, when a cell using shortened TTIs is allocated to the user terminal, the user terminal can allocate (and/or detect) the shortened TTI in accordance with an implicit or explicit notification from a radio base station. An example of shortened TTI notification applicable to this embodiment will be explained regarding at least one of the following cases: (1) implicit notification, and explicit notification such as (2) broadcast information or radio resource control (RRC) signaling, (3) medium access control (MAC) signaling, and (4) physical (PHY) signaling.

In the case of (1) implicit notification, the user terminal may allocate a shortened TTI (e.g., determine that a communication cell, a channel, or a signal is based on a shortened TTI) depending on whether or not a frequency band (e.g., 5G band and unlicensed band), a system band width (e.g., 100 MHz), or listen before talk (LBT) through license assisted access (LAA) is applied, and on the type of data to transmit (e.g., control data and voice), a logic channel, a transport block, a radio link control (RLC) mode, and a cell-radio network temporary identifier (C-RNTI).

Upon detection of control information (DCI) directed at the terminal through a PDCCH and/or 1 ms EPDCCH mapped to the top 1, 2, 3, or 4 symbol in a normal TTI, a 1-ms-long section including the PDCCH/EPDCCH may be determined to be a normal TTI. Upon detection of control information (DCI) directed at the terminal through a PDCCH/EPDCCH with the other configurations (e.g., a PDCCH and/or up-to-1-ms-long EPDCCH mapped to the symbols in the normal TTI other than the top 1-4 symbols), a predetermined time section of less than 1 ms that includes the PDCCH/EPDCCH may be determined to be a shortened TTI. Here, detection of control information (DCI) directed at the terminal can be performed based on the CRC results for blind-decoded DCI.

In the case of (2) broadcast information or RRC signaling, a shortened TTI may be allocated based on allocation information sent from a radio base station (e.g., a first cell) to the user terminal through broadcast information or RRC signaling. The allocation information indicates, for example, information on a CC and/or subframe using a shortened TTI, a channel and/or signal using a shortened TTI, and the TTI length of a shortened TTI. The user terminal allocates a shortened TTI in a semi-static manner in accordance with allocation information from a radio base station. It should be noted that mode switching between a shortened TTI and a normal TTI may be made through an RRC reconfiguration process, or Intra-cell handover (HO) for Pcells and a CC (Scell) removing/adding process for Scells.

In the case of (3) MAC signaling, a shortened TTI allocated based on allocation information sent through RRC signaling may be activated or de-activated by MAC signaling. To be specific, the user terminal activates or de-activates a shortened TTI based on a MAC control element sent from a radio base station. The user terminal has a timer preliminarily set to it through higher-layer signaling, such as RRC, to indicate the activation period for a shortened TTI. If no UL/DL assignment of the shortened TTI is made in a predetermined time after the shortened TTI is activated by an L2 control signal, the shortened TTI may be deactivated. Such a shortened TTI deactivating timer may count by a normal TTI (1 ms) or shortened TTI (e.g., 0.25 ms).

For mode switching between a shortened TTI and a normal TTI in a Scell, the Scell may be temporarily deactivated or determined to expire on the timing advance (TA) timer. This enables a communication halt period to be provided during mode switching.

In the case of (4) PHY signaling, a shortened TTI allocated based on allocation information sent through RRC signaling may be scheduled by PHY signaling. To be specific, the user terminal detects a shortened TTI based on information contained in a received and detected physical downlink control channel (a physical downlink control channel (PDCCH) or an enhanced physical downlink control channel (EPDCCH), which will be hereinafter denoted as PDCCH/EPDCCH).

For example, control information (DCI) that assign transmission and reception for a normal TTI and a shortened TTI are provided with different information elements, and upon detection of control information (DCI) including an information element that assigns transmission/reception through the shortened TTI, (4-1) the user terminal may determine that the shortened TTI is a predetermined time section including the time when the PDCCH/EPDCCH is detected. The user terminal is capable of blind decoding of control information (DCI) that assign transmission or reception for both the normal TTI and shortened TTI through a PDCCH/EPDCCH. Alternatively, upon detection of downlink control information (DCI) including an information element that assigns transmission/reception through the shortened TTI, (4-2) the user terminal may determine that the shortened TTI is a predetermined time section including the time of transmission/reception of a PDSCH or PUSCH scheduled through (down link control information (DCI) transferred through) the PDCCH/EPDCCH. Alternatively, upon detection of DCI including an information element that assigns transmission/reception through the shortened TTI, (4-3) the user terminal may determine that the shortened TTI is a predetermined time section including the time of transmission or reception of retransmission control information (hybrid automatic repeat request-acknowledgement (HARQ-ACK), ACK/NACK, or A/N) for a PDSCH or PUSCH scheduled through (DCI transferred through) the PDCCH/EPDCCH.

For detection of a shortened TTI on the basis of information contained in a physical downlink control channel, control information (DCI) that instructs to transmit/receive with a shortened TTI may be transmitted/received a predetermined time before the transmission/reception of the shortened TTI. In particular, a radio base station transmits control information (DCI), which instructs to transmit/receive with a shortened TTI, in a predetermined period, and the user terminal receiving the control information (DCI) transmits/receives the shortened TTI after the elapse of a predetermined period of time (e.g., the integral multiple of the TTI length or the integer of the subframe length). A shortened TTI and a normal TTI may require different signal processing algorithms (e.g., channel estimation and error correction decoding). In this manner, control information (DCI) that instructs to transmit/receive with a shortened TTI is transmitted/received a predetermined time before the actual transmission/reception of the shortened TTI, thereby ensuring a time for the change of the signal processing algorithm by the user terminal.

Another way is to allocate a shortened TTI through higher-layer signaling, such as RRC, and perform switching to transmission/reception using a normal TTI upon un instruction by control information (DCI) transmitted/received through a physical downlink control channel. In general, a shortened TTI which requires low-delay signal processing needs higher user throughput than a normal TTI. For this reason, dynamic switching is only made from a shortened TTI to a normal TTI, so that a load on the user terminal during signal processing due to TTI length change can be relieved compared with the case where dynamic switching from a normal TTI to a shortened TTI is allowed.

The user terminal may detect a shortened TTI on the basis of the state (e.g., idle state or connected state) of the user terminal. For example, the user terminal in the idle state may regard all the TTIs as normal TTIs and performs blind decoding of PDCCHs contained in the top 1-4 symbols of each 1-ms normal TTI. In contrast, the user terminal in the connected state may allocate (and/or detect) a shortened TTI on the basis of at least one of the aforementioned notification examples (1) to (4).

As described above, future radio communication assumes communication using a shortened TTI, which has a shorter transmission time interval (TTI) than a normal TTI, for UL transmission and/or DL transmission. Meanwhile, existing LTE systems perform communication timing control subframe (1 ms) by subframe.

For example, TDD in existing systems control transmission timings based on UL/DL configurations each defining 1-ms-long UL subframes and DL subframes. (see FIG. 5). FIG. 5 shows a multiple-frame configuration (UL/DL configuration) in which UL subframes and DL subframes are based on different transmission ratios.

TDD in existing systems defines seven frames, i.e., UL/DL configurations 0 to 6. Subframes #0 and #5 are allocated to downlink, and a subframe #2 is allocated to uplink. In UL/DL configurations 0, 1, 2, and 6, a cycle of switching from a DL subframe to a UL subframe (uplink/downlink switching cycle) is 5 ms. In UL/DL configurations 3, 4, and 5, an uplink/downlink switching cycle is 10 ms.

FIG. 6 shows special subframe configurations (Sp-SF Configs) in existing systems. In existing systems, 10 normal CPs and 8 extended CPs are defined as special subframe configurations. Information on a special subframe configuration directed at a primary cell (PCell) is sent to the user terminal through system information (SIB1), and that directed at a secondary cell (SCell) is sent to the user terminal through RRC signaling.

The figures shown in the table of FIG. 6 each represent the number of OFDM (or SC-FDMA) symbols. Each special subframe configuration in existing systems only has up to two symbols of uplink time sections (UpPTSs). For this reason, a special subframe does not support transmission of user data transmitted through a physical uplink shared channel (e.g., PUCCH) in a UL subframe, uplink control signals (UCI) transmitted through a physical uplink control channel (e.g., PUCCH), and the like. A special subframe in existing systems only supports transmission of PRACH and SRS for UL transport.

In TDD, synchronization is important for suppression of an interference between uplink and downlink. For example, synchronization between not only user terminals connected to the same TDD cell (radio base station) but also multiple TDD cells and adjacent TDD carriers (operators) is effective in suppressing an interference between uplink and downlink.

Figure 7:
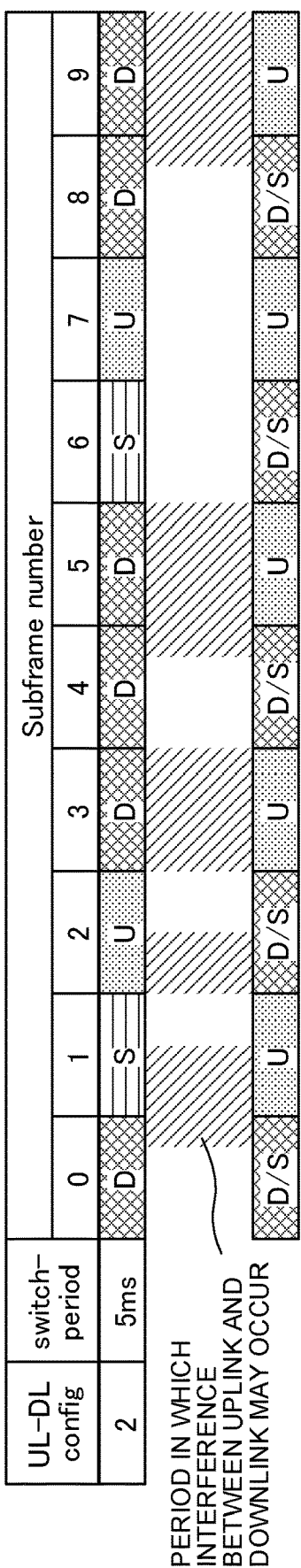
FIG. 7 is a diagram for explaining interference that occurs between a normal TTI and a shortened TTI using the same carrier but different UL/DL configurations.

Considering that user terminals (legacy terminals), which communicate using an existing LTE system function, are present in the same carrier, a shortened UL-DL switching cycle for the user terminal which communicates using a shortened TTI may cause an interference between uplink and downlink. Suppose, for example, that a shortened UL-DL switching cycle of 2 ms is applied to a shortened TTI-based user terminal (see FIG. 7). FIG. 7 shows the case where a user terminal using UL/DL configurations based on existing systems and a user terminal using a UL-DL switching cycle of 2 ms communicate in the same carrier.

In this case, a period involving an uplink and downlink interference occurs between a user terminal, which use UL/DL configurations of existing systems, and a user terminal, which use UL/DL configurations intended for shortened TTIs. This may impair the communication quality. To solve this problem, UL/DL configurations of existing systems may also be used for the user terminal using a shortened TTI for communication (e.g., UL transmission).

However, if a shortened TTI is defined assuming UL/DL switching of a cycle of 5 or 10 ms, not much reduction in delay is obtained. As described above, when a shortened TTI is used for cells (TDD carriers) based on TDD, how to control transmission (e.g., UL transmission) matters. Thus, a method for delay reduction is required.

The present inventors therefore have arrived at one embodiment of the present invention in which, for communication with multiple carriers including TDD carriers using shortened TTIs, another carrier is used for at least part of UL transmission for the shortened TTIs of the TDD carriers.

For example, the user terminal is configured to transmit at least one of UL signals (e.g., uplink data and uplink control signals) related to DL signals for the shortened TTIs of the TDD carriers, by using another carrier in predetermined periods. Transmission periods (transmission periods for shortened TTIs) shorter than UL transmission periods for existing systems can be used as these predetermined periods. Accordingly, even when shortened TTIs are used for TDD carriers, UL/DL configurations can be set in the same manner as in existing systems and the occurrence of an uplink and downlink interference can be suppressed. Besides, UL transmission related to DL signals based on shortened TTIs can be made in transmission periods shorter than in existing systems, so that delays in TDD carriers can be reduced.

Embodiments will now be described in detail. The following description illustrates the case where one subframe (1 ms) based on existing systems is divided into three shortened TTIs (0.33 ms), although the applicable length of each shortened TTI is not limited to this. It should be noted that a 1-ms TTI may be referred to as a normal TTI, a normal TTI, a long TTI, a normal subframe, a normal subframe, or a long subframe. A TTI shorter than a normal TTI may be referred to as a shortened TTI or a shortened subframe. In addition, the structures shown in FIGS. 1 to 4 can be applied to shortened TTIs according to this embodiment.

Although an LTE system will be described below as an example, this embodiment is not limited to it and any system using TDD carriers with shortened TTIs can be used. Embodiments described below may be implemented alone or in combination.

First Embodiment

The first embodiment explains a method of transmitting arrival confirmation signals (HARQ-ACK, ACK/NACK, A/N) related to DL transmission for a TDD carrier using shortened TTIs. The description below assumes that the time (HARQ time) when A/N related to DL transmission is fed back comes 1 ms after DL assignment (DL signal reception). The HARQ time is not limited to 1 ms and can be changed depending on the shortened TTI length, for example.

For DL reception through the TDD carrier using shortened TTIs, the user terminal is controlled such that at least part of UL transmission related to DL reception in each TTI is performed through another carrier configured as a pair-band. FIG. 8 shows the case where the other carrier is used to transmit A/N related to a DL signal directed at the TDD carrier using shortened TTIs.

The other carrier may be any carrier (or cell or CC) configured as a pair-band, FDD UL, or the other TDD carrier. Alternatively, the other carrier may be a carrier using normal TTIs or a carrier using shortened TTIs. When the other carrier uses shortened TTIs, its length may be equal to or different from that of shortened TTIs for the TDD carrier.

FIG. 8A shows the other carrier as FDD UL. To be specific, the user terminal can feedback A/N related to a DL signal for the shortened TTIs for the TDD carrier in a predetermined time (here, 1 ms) using FDD UL. Here, the TDD carrier uses a UL/DL configuration #2, although this is not necessarily the case.

In this case, in the TDD carrier using shortened TTIs, the same UL period and DL period as in UL/DL configurations based on TDD in existing systems can be set and the transmission time for A/N for the TDD carrier is shorter than the transmission time (e.g., 4 ms or more) in existing systems.

FIG. 8B shows the case where the other carrier is the other TDD carrier (here, UL/DL configuration #0). To be specific, the user terminal can feedback A/N related to a DL signal for the TDD carrier using shortened TTIs in a predetermined time, using a UL subframe in the other TDD carrier. Here, the TDD carrier uses a UL/DL configuration #2 and the other TDD carrier uses a UL/DL configuration #0, although this is not necessarily the case.

The UL/DL configuration used for the other TDD carrier may be the same as or different from the UL/DL configuration of the TDD carrier (A/N source) using shortened TTIs. When the TDD carriers have different UL/DL configurations, it is preferable that the UL/DL configuration used for the other TDD carrier include a higher proportion of UL subframes than for the TDD carrier serving as the A/N source. In this case, the other TDD carrier can be provided with a larger amount of UL resource that can be used for A/N transmission related to DL assignment to the TDD carrier serving as an A/N source.

A pair-band (the other carrier) which performs A/N transmission for the TDD carrier using shortened TTIs can be allocated to the user terminal through higher-layer signaling (e.g., RRC signaling) which is given to individual UE pieces. For example, when one TDD carrier communicates using shortened TTIs, the radio base station notifies the user terminal of at least one of the following information blocks (a1) to (e1) through higher-layer signaling.

(a1) information on the TDD carrier using shortened TTIs
(b1) information on the shortened TTIs used
(c1) information on the HARQ time used
(d1) information on the carrier serving as a pair-band
(e1) information on the subframe using shortened TTIs Upon reception of information (a1), the user terminal can determine which TDD carrier uses shortened TTIs in the case of the use of multiple TDD carriers. Upon reception of information (b1), the user terminal can determine what type of shortened TTI is used (e.g., 0.5 ms or 0.25 ms, or seven symbols or three symbols). Upon reception of information (c1), the user terminal can determine what type of HARQ time is used (e.g., 1 ms or 2 ms). Upon reception of information (d1), the user terminal can determine which carrier is used as a pair-band (e.g., band number). Upon reception of information (e1), the user terminal can determine which subframe uses shortened TTIs.

FIG. 8 shows the case where the other carrier is used to transmit all A/N related to a DL signal in each TTI for the TDD carrier using shortened TTIs, although this embodiment is not limited to this. For example, under control, part of A/N in each TTI for the TDD carrier can be transmitted using the other carrier and predetermined A/N can be transmitted using the TDD carrier (base carrier). The following description is about the case where transmission of A/N related to each DL transmission for the TDD carrier is controlled using the TDD carrier (base carrier) and the other carrier.

<TTI Position and UL Resource Position in DL Assignment>

The user terminal can be configured to transmit A/N related to predetermined DL assignment for the TDD carrier by using the pair-band, and the other A/N by using UL of the TDD carrier (base carrier). For example, the user terminal can determine the carrier through which A/N related to each DL assignment is transmitted, depending on the TTI position (DL transmission period) in which DL assignment is performed through the TDD carrier, and the UL resource position (UL transmission period) for the TDD carrier and/or the pair-band.

FIG. 9 shows the case where the carrier through which A/N related to DL assignment is transmitted is selected, depending on the TTI position in which DL assignment has been performed through the TDD carrier, and the UL resource position for the TDD carrier and/or the other carrier serving as a pair-band. FIG. 9A shows the case where the other carrier, serving as a pair-band, is FDD UL, and FIG. 9B shows the case where the other carrier, serving as a pair-band, is the other TDD carrier (here, UL/DL configuration #0).

In the case shown in FIG. 9A, if A/N related to DL assignment is transmitted in a predetermined time (here, 1 ms), the user terminal determines whether A/N can be transmitted through the TDD carrier (whether there is a UL resource) 1 ms after the TTI in which DL assignment is performed. If it is determined that A/N can be transmitted through the TDD carrier in 1 ms, the user terminal transmits A/N through the TDD carrier. In contrast, if no UL resource is found in the TDD carrier in 1 ms, the user terminal transmits A/N through UL of an FDD carrier.

Similarly, in the case shown in FIG. 9B, if A/N related to DL assignment is transmitted in 1 ms, the user terminal determines whether A/N can be transmitted through the TDD carrier 1 ms after the TTI in which DL assignment is performed. If it is determined that A/N can be transmitted through the TDD carrier in 1 ms, the user terminal transmits A/N through the TDD carrier. In contrast, if there is no UL resource in the TDD carrier in 1 ms but in the other TDD carrier, the user terminal transmits A/N through the UL resource of the other TDD carrier.

In this manner, A/N related to predetermined DL assignment is selectively transmitted through the pair-band, and the other A/N are transmitted through the TDD carrier (base carrier), thereby improving the use efficiency of frequency in the base carrier. Predetermined DL assignment here may correspond to DL assignment performed at the time which comes after a predetermined time and at which the TDD carrier has no UL resource.

<Notification Using Downlink Control Information>

The user terminal may determine the carrier (UL resource) for transmitting A/N related to a DL signal directed at a TDD carrier using shortened TTIs, in accordance with downlink control information. In this case, a radio base station explicitly sends the user terminal information on the carrier for transmitting A/N related to the DL signal contained in a predetermined bit region of downlink control information (DCI) transmitted in a shortened TTI of the TDD carrier. The downlink control information here may be, for example, a DCI format for downlink assignment (DL assignment).

The user terminal can select the carrier for A/N transmission, depending on the predetermined bit region of downlink control information received at each shortened TTI of the TDD carrier. The predetermined bit region of downlink control information can contain information on the carrier for A/N transmission (e.g., a band number and other information on the carrier, and information on the UL resource).

<Special Subframe with UpPTS>

The user terminal may be configured to transmit A/N by using an UpPTS of a special subframe. For example, when a special subframe exists a predetermined time (e.g., 1 ms) after a shortened TTI in which DL assignment is performed through a TDD carrier, the user terminal assigns A/N to the special subframe (UpPTS) and transmits it.

FIG. 10 shows the case where a carrier through which A/N related to DL assignment is transmitted is selected, depending on the TTI position in which DL assignment has been performed through the TDD carrier, and the UL resource position for the TDD carrier and/or the other carrier serving as a pair-band. Here, the UL resource position for the TDD carrier includes a special subframe (UpPTS). FIG. 10A shows the case where the other carrier, serving as a pair-band, is FDD UL, and FIG. 10B shows the case where the other carrier, serving as a pair-band, is the other TDD carrier (here, UL/DL configuration #0).

In the case shown in FIG. 10A, if A/N related to DL assignment is transmitted in a predetermined time (here, 1 ms), the user terminal determines whether A/N can be transmitted through the TDD carrier (whether there is a UL resource) 1 ms after the TTI in which DL assignment is performed. If there is a UL subframe or special subframe (UpPTS) in a TDD carrier in 1 ms, the user terminal transmits A/N through the TDD carrier. If there is no UL subframe or special subframe (UpPTS) in the TDD carrier in 1 ms, the user terminal transmits A/N through UL of the FDD carrier.

Similarly, in the case shown in FIG. 10B, if A/N related to DL assignment is transmitted in 1 ms, the user terminal determines whether A/N can be transmitted through the TDD carrier 1 ms after the TTI in which DL assignment is performed. If there is a UL subframe or special subframe (UpPTS) of the TDD carrier in 1 ms, the user terminal transmits A/N through the TDD carrier. In contrast, if there is no UL subframe or special subframe (UpPTS) in the TDD carrier in 1 ms but there is a UL resource (UL subframe and/or special subframe (UpPTS)) in the other TDD carrier, the user terminal transmits A/N through the UL resource of the other TDD carrier.

Accordingly, A/N transmission through an UpPTS of a special subframe further improves the use efficiency of frequency in the base carrier (TDD carrier) compared with the case shown in FIG. 9.

Besides, as shown in FIG. 6, an UpPTS (up to two symbols) in a special subframe in existing systems do not support A/N transmission. Accordingly, for A/N feedback through an UpPTS in an existing special subframe, A/N needs to be transmitted with one or two symbols. In this case, a PUCCH format (new PUCCH format) with which A/N can be transmitted with one or two symbols is defined to control the assignment of a PUCCH related to one or two symbols of an UpPTS (see FIG. 11A).

The new PUCCH format used for the UpPTS may also be used for transmitting a PUCCH in a shortened TTI in a UL subframe. In this case, the same PUCCH format can be used for the UL subframe (shortened TTI) of the TDD carrier and the UpPTS in the special subframe. In this manner, the use of shortened TTIs leads to a smaller number of new PUCCH formats that should be loaded in the user terminal, thereby reducing the cost of loading to the terminal.

It should be noted that in such a new PUCCH format, which needs a smaller TTI length for less delay, the TTI length is preferably smaller than the conventional TTI length (1 ms). However, a smaller TTI length results in lower A/N reception quality. For example, when a shortened TTI is made by reducing the number of OFDM symbols contained in the TTI length, the number of samples of signals used for A/N transmission decreases, so that the A/N bit energy that can be ensured with the same transmission power decreases. When a shortened TTI is made by shortening the OFDM symbol length without changing the number of OFDM symbols contained in the TTI length, the sub-carrier spacing extends and the number of samples per OFDM symbol decreases, so that the A/N bit energy that can be ensured with the same transmission power decreases. A decrease in A/N bit energy may cause an increase in bit error rate or block error rate.

For this reason, to ensure A/N bit energy, a new PUCCH format transmitted in a shortened TTI or UpPTS may be used with one or more of the following schemes: (1) transmission power boost (increase transmission power to a higher level than in transmission of another PUCCH format), (2) transmit with multiple resource blocks (transmit with a sequence of frequency resource blocks), and (3) transmit antenna diversity. The user terminal which supports this new PUCCH format may essentially support any or all of the aforementioned schemes (1) to (3).

In a special subframe for existing TDD carriers, the maximum number of symbols in an UpPTS is limited to two. Accordingly, this embodiment may feature the configuration of a new special subframe including a UpPTS of three or more symbols (see FIG. 11B). Although FIG. 11B shows the case where a DwPTS has five symbols, a gap has two symbols, and an UpPTS has seven symbols, the configuration of a special subframe is not limited to this.

In this case, A/N related to a DL signal transmitted in a shortened TTI is easily assigned to an UpPTS in a special subframe. Thus, delay can be reduced.

<Control of Transmission Time Delay for Predetermined HARQ-ACK>

When a pair-band used for A/N transmission through a TDD carrier is another TDD carrier (see FIGS. 8B, 9B, and 10B, for example), a UL resource (UL subframe) may be absent a predetermined time after DL assignment in a shortened TTI. In this case, a TDD carrier using shortened TTIs can be controlled such that DL assignment (DL transmission) featuring no UL resource is not performed in a predetermined time.

Meanwhile, to increase the use efficiency of the radio resource (e.g., DL resource) for a TDD carrier, it is preferable not to limit DL assignment through the TDD carrier. For this reason, the A/N feedback time related to DL assignment performed without a UL resource present for a base carrier and/or pair-band in a predetermined time may be made longer than a predetermined time (e.g., 1 ms) (see FIG. 12A).

In FIG. 12A, in a pair-band (another TDD carrier) and/or base carrier in a predetermined time, DL assignment is allowed even in a shortened TTI featuring no corresponding UL resource. The user terminal is controlled such that the A/N feedback time related to the DL assignment is extended (delay is allowed) and transmission is performed using the UL resource for the base carrier or the other TDD carrier. Accordingly, even if the pair-band is the other TDD carrier, DL assignment can be performed independently of the position of the UL resource for the other TDD carrier.

Although FIG. 12A shows the case where A/N related to DL assignment performed without a UL resource present in 1 ms is assigned to the next UL subframe, the UL resource to which A/N with an extended feedback time is not limited to this.

Alternatively, the user terminal may use A/N related to DL assignment performed without a UL resource present in a pair-band and/or base carrier in a predetermined time, as a subframe in which DL assignment is performed using normal TTIs (see FIG. 12B). In this case, the HARQ time for DL assignment using normal TTIs may be that defined for normal TTIs.

In this manner, the A/N feedback time for DL assignment (DL-TTI) performed without a UL resource present in a predetermined time is separately controlled, thereby increasing the use efficiency of the resource for the TDD carrier.

It should be noted that in the first embodiment, a physical uplink control channel (e.g., PUCCH) and/or physical uplink shared channel (e.g., PUSCH) allocated to the other carrier can be used as the UL resource for the carrier serving as a pair-band. For example, if the time when A/N is multiplexed over the other carrier serving as a pair-band overlaps uplink data (e.g., PUSCH) transmission through the other carrier, A/N can be multiplexed over a PUSCH. In contrast, if the time when A/N is multiplexed over the other carrier serving as a pair-band does not overlap any uplink data transmission through the other carrier, A/N can be multiplexed over a physical uplink control channel (e.g., PUCCH) PUSCH.

When the user terminal, which is connected to a plurality of carriers (or cells or CCs), transmits A/N for the TDD carrier through the other carrier and no uplink data is transmitted to either of the carriers, A/N may be multiplexed over a physical uplink control channel for a predetermined carrier. The predetermined carrier here may be referred to as PCell, PSCell, or PUCCH cell. Alternatively, when A/N for the TDD carrier is transmitted through the other carrier and either carrier receives uplink data, A/N may be multiplexed over the PUSCH for the carrier receiving the uplink data and then be transmitted.

Second Embodiment

The second embodiment explains a method of UL transmission based on UL transmission instruction (UL grant)

contained in a DL signal for a TDD carrier using shortened TTIs. The description below assumes that the time when UL transmission related to a UL grant comes 1 ms after UL assignment (UL grant reception). Needless to say, the UL transmission time is not limited to 1 ms and can be changed depending on the shortened TTI length, for example.

For reception of a UL grant through the TDD carrier using shortened TTIs, the user terminal is controlled such that at least part of UL transmission related to the UL grant in each TTI is performed through another carrier configured as a pair-band (see FIG. 8). Examples of UL transmission include UL data (e.g., PUSCH) transmission and aperiodic CSI transmission.

The other carrier may be any carrier (or cell or CC) configured as a pair-band, FDD UL, or another TDD carrier. Alternatively, the other carrier may be a carrier using normal TTIs or a carrier using shortened TTIs (having the same TTI length or different TTI lengths).

FIG. 8A shows the other carrier as FDD UL. The user terminal can feedback uplink data related to a DL signal (UL grant) for the TDD carrier using shortened TTIs, in a predetermined time (here, 1 ms) using FDD UL. Here, the TDD carrier uses a UL/DL configuration #2, although this is not necessarily the case.

In this case, in the TDD carrier using shortened TTIs, the same UL period and DL period as in UL/DL configurations based on TDD in existing systems can be set and the transmission time for uplink data for the TDD carrier is shorter than the transmission time (e.g., 4 ms or more) in existing systems.

FIG. 8B shows the case where the other carrier is the other TDD carrier (UL/DL configuration #0). The user terminal can feedback uplink data related to a UL grant for the TDD carrier using shortened TTIs in a predetermined time, using a UL subframe (e.g., PUSCH) in the other TDD carrier. Here, the TDD carrier uses a UL/DL configuration #2 and the other TDD carrier uses a UL/DL configuration #0, although this is not necessarily the case.

A UL/DL configuration used for the other TDD carrier may be the same as or different from the UL/DL configuration of a TDD carrier (uplink data source) using shortened TTIs. When the TDD carriers have different UL/DL configurations, it is preferable that the UL/DL configuration used for the other TDD carrier include a higher proportion of UL subframes than for the TDD carrier serving as the uplink data source. In this case, the other TDD carrier can be provided with a greater amount of UL resource that can be used for uplink data transmission related to the UL grant for the TDD carrier serving as the uplink data source.

The pair-band (the other carrier) which performs uplink data transmission for the TDD carrier using shortened TTIs can be allocated to the user terminal through higher-layer signaling (e.g., RRC signaling) which is given UE by UE. For example, when one TDD carrier communicates using shortened TTIs, the radio base station notifies the user terminal of at least one of the following information blocks (a2) to (e2) through higher-layer signaling.

(a2) information on the TDD carrier using shortened TTIs
(b2) information on the shortened TTIs used
(c2) information on the UL transmission (e.g., uplink data transmission) time used
(d2) information on the carrier serving as the pair-band
(e2) information on a subframe using shortened TTIs Upon reception of information (a2), the user terminal can determine which TDD carrier uses shortened TTIs in the case of the use of multiple TDD carriers. Upon reception of information (b2), the user terminal can determine what type of shortened TTI is used (e.g., 0.5 ms or 0.25 ms, or seven symbols or three symbols). Upon reception of information (c2), the user terminal can determine what type of UL transmission time is used (e.g., 1 ms or 2 ms). Upon reception of information (d2), the user terminal can determine which carrier is used as a pair-band (e.g., band number). Upon reception of information (e2), the user terminal can determine which subframe uses shortened TTIs.

FIG. 8 shows the case where the other carrier is used to transmit all uplink data related to the UL grand in each TTI for the TDD carrier using shortened TTIs, although this embodiment is not limited to this. For example, under control, part of uplink data in each TTI for the TDD carrier can be transmitted using the other carrier and predetermined uplink data can be transmitted using the TDD carrier (base carrier). The following description is about the case where transmission of uplink data related to each UL grant in each TTI is controlled using the TDD carrier (base carrier) and the other carrier.

<TTI Position and UL Resource Position in UL Assignment>

The user terminal can be configured to perform UL transmission related to a predetermined UL grant in each TDD carrier by using a pair-band, and the other UL by using the UL resource of the TDD carrier (base carrier). For example, the user terminal can determine the carrier through which UL transmission related to each UL assignment, depending on the TTI position (UL grant reception period) in which UL assignment is performed through the TDD carrier, and the UL resource position (UL transmission period) for the TDD carrier and/or the pair-band.

FIG. 9 shows the case where the carrier through which uplink data related to UL assignment is transmitted is selected, depending on the TTI position in which UL assignment is performed through the TDD carrier, and the UL resource position for the TDD carrier and/or the other carrier serving as the pair-band. FIG. 9A shows the case where the other carrier, serving as the pair-band, is FDD UL, and FIG. 9B shows the case where the other carrier, serving as the pair-band, is the other TDD carrier (here, UL/DL configuration #0).

In the case shown in FIG. 9A, if uplink data related to UL assignment is transmitted in a predetermined time (here, 1 ms), the user terminal determines whether uplink data can be transmitted through the TDD carrier 1 ms after the TTI in which UL assignment is performed (whether there is a UL resource). If it is determined that uplink data can be transmitted through the TDD carrier in 1 ms, the user terminal transmits uplink data through the TDD carrier. In contrast, if there is no UL resource in the TDD carrier in 1 ms, the user terminal transmits A/N through UL of an FDD carrier.

Similarly, in the case shown in FIG. 9B, if uplink data related to UL assignment is transmitted in 1 ms, the user terminal determines whether uplink data can be transmitted through the TDD carrier 1 ms after the TTI in which UL assignment is performed. If it is determined that uplink data can be transmitted through the TDD carrier in 1 ms, the user terminal transmits uplink data through the TDD carrier. In contrast, if no UL resource is found in the TDD carrier in 1 ms and a UL resource is found in the other TDD carrier, the user terminal transmits uplink data through the UL resource of the other TDD carrier.

In this manner, uplink data related to predetermined UL assignment is selectively transmitted through the pair-band, and the other uplink data are transmitted through a TDD carrier (base carrier), thereby improving the use efficiency of frequency in the base carrier. Predetermined UL assignment here may correspond to UL assignment at the time which is after a predetermined time and at which the TDD carrier has no UL resource.

<Notification Using Downlink Control Information>

The user terminal may determine the carrier (UL resource) for UL transmission related to a UL grant directed at the TDD carrier using shortened TTIs, in accordance with downlink control information. In this case, a radio base station explicitly sends the user terminal information on the carrier for transmitting uplink data related to the UL grant contained in a predetermined bit region of downlink control information (DCI) transmitted in a shortened TTI of the TDD carrier. The downlink control information here may be, for example, a DCI format for uplink assignment.

The user terminal can select the carrier for uplink data transmission, depending on the predetermined bit region of downlink control information received at each shortened TTI of the TDD carrier. The predetermined bit region of downlink control information can contain information on the carrier for uplink data transmission (e.g., a band number and other information on the carrier, and information on the UL resource).

<Special Subframe with UpPTS>

The user terminal may be configured to transmit uplink data (e.g., PUSCH) by using an UpPTS of a special subframe. For example, when a special subframe exists a predetermined time (e.g., 1 ms) after a shortened TTI in which UL assignment is performed through the TDD carrier, the user terminal assigns uplink data to the special subframe (UpPTS) and transmits it.

FIG. 10 shows the case where the carrier through which uplink data related to UL assignment is transmitted is selected, depending on the TTI position in which UL assignment is performed through the TDD carrier, and the UL resource position for the TDD carrier and/or the other carrier serving as the pair-band. Here, the UL resource position for the TDD carrier includes a special subframe (UpPTS). FIG. 10A shows the case where the other carrier, serving as the pair-band, is FDD UL, and FIG. 10B shows the case where the other carrier, serving as the pair-band, is the other TDD carrier (here, UL/DL configuration #0).

In the case shown in FIG. 10A, if uplink data related to UL assignment is transmitted in 1 ms, the user terminal determines whether uplink data can be transmitted through the TDD carrier 1 ms after the TTI in which UL assignment is performed (whether there is a UL resource). If there is a UL subframe or special subframe (UpPTS) of a TDD carrier in 1 ms, the user terminal transmits uplink data through the TDD carrier. In contrast, if there is no UL subframe or special subframe (UpPTS) in the TDD carrier in 1 ms, the user terminal transmits uplink data through UL of an FDD carrier.

Similarly, in the case shown in FIG. 10B, if uplink data related to UL assignment is transmitted in 1 ms, the user terminal determines whether uplink data can be transmitted through the TDD carrier 1 ms after the TTI in which UL assignment is performed. If there is no UL subframe or special subframe (UpPTS) in the TDD carrier in 1 ms but there is a UL resource (UL subframe and/or special subframe (UpPTS)) in the other TDD carrier, the user terminal transmits uplink data through the UL resource of the other TDD carrier.

Accordingly, uplink data transmission through an UpPTS of a special subframe further improves the use efficiency of frequency in the base carrier (TDD carrier) compared with the case shown in FIG. 9.

Besides, as shown in FIG. 6, UpPTSs (up to two symbols) in a special subframe in existing systems do not support uplink data transmission. Accordingly, for uplink data transmission through an UpPTS in an existing special subframe, uplink data needs to be transmitted with one or two symbols. In this case, a PUSCH configuration (new PUSCH configuration) with which uplink data can be transmitted with one or two symbols is defined to control the assignment of a PUSCH related to one or two symbols of an UpPTS (see FIG. 13A).

The new PUSCH configuration used for the UpPTS may also be used for transmitting a PUSCH in a shortened TTI in a UL subframe. In this case, the same PUSCH configuration can be used for the UL subframe (shortened TTI) of the TDD carrier and the UpPTS in the special subframe. In this manner, the use of shortened TTIs leads to a smaller number of new PUSCH configurations that should be loaded in the user terminal, thereby reducing the cost of loading to the terminal. It should be noted that the PUSCH configuration here refers to the order of mapping to a UL data resource element, the location to which DMRS is mapped, the location to which SRS is mapped, and a UCI (CQI/PMI, RI, HARQ-ACK) mapping rule in a PUSCH resource in use of UCI on PUSCH.

In a special subframe for existing TDD carriers, the maximum number of symbols in an UpPTS is limited to two. Accordingly, this embodiment may feature the configuration of a new special subframe including a UpPTS of three or more symbols (see FIG. 13B). Although FIG. 13B shows the case where a DwPTS has five symbols, a gap has two symbols, and an UpPTS has seven symbols, the configuration of a special subframe is not limited to this.

In this case, uplink data related to a UL grant transmitted in a shortened TTI is easily assigned to an UpPTS in a special subframe. Thus, delay can be reduced.

Third Embodiment

The third embodiment is applicable to the user terminal that does not have uplink carrier aggregation capability (UL-CA capability) of the first embodiment and/or the second embodiment.

To perform UL transmission with a plurality of CCs (or cells or carriers), the user terminal needs to be capable of carrier aggregation. Meanwhile, considering the presence of the existing user terminal (legacy terminal) and a reduction in the cost of the user terminal, it is preferable that communication through TTD carriers using shortened TTIs be supported even for the user terminal that does not have UL-CA capability.

For example, although a pair-band is featured for shortened TTI-based UL transmission, UL transmission using the pair-band is allowed even without UL-CA. To be specific, in a pair-band used for UL transmission through a TDD carrier, UL transmission through the TDD carrier (base carrier) is not performed (limited) in the period when UL transmission is performed.

For example, it is assumed that the other carrier used for UL transmission (e.g., A/N and uplink data) through the TDD carrier is FDD UL. In this case, the user terminal is controlled such that UL transmission through the TDD carrier is not performed at the time when UL transmission is performed in a pair-band (in this case, every subframe (TTI)) (see FIG. 14).

In this case, if UL transmission, such as CQI report or SRS transmission, through the TDD carrier (base carrier) is scheduled at the time when UL transmission is performed in a pair-band, the user terminal may be controlled such that UL transmission through the base carrier is dropped (not transmitted). It should be noted that CQI report through the TDD carrier may be made through the other carrier (e.g., the pair-band).

In addition, when transmission and reception should be made using normal TTIs, the user terminal can be controlled such that it transmits and receives using the TDD carrier (base carrier) even if the TDD carrier is supposed to use shortened TTIs. In this case, the HARQ time and the UL transmission period may be the same as in existing systems.

As described above, in a pair-band, UL transmission through the TDD carrier is not performed (limited) in the period when UL transmission is performed, so that UL transmission through the pair-band can also be applied to the user terminal which does not have CA capability (e.g., UL-CA capability). In this case, signaling of user capability (UE capability) of UL transmission using a pair-band may be independent of CA and UL-CA capability.

(Radio Communication System)

The configuration of a radio communication system according to one embodiment of the present invention will now be described. This radio communication system employs any of the radio communication methods according to the aforementioned embodiments. It should be noted that the radio communication methods according to the embodiments may be used alone or in combination.

Figure 15:
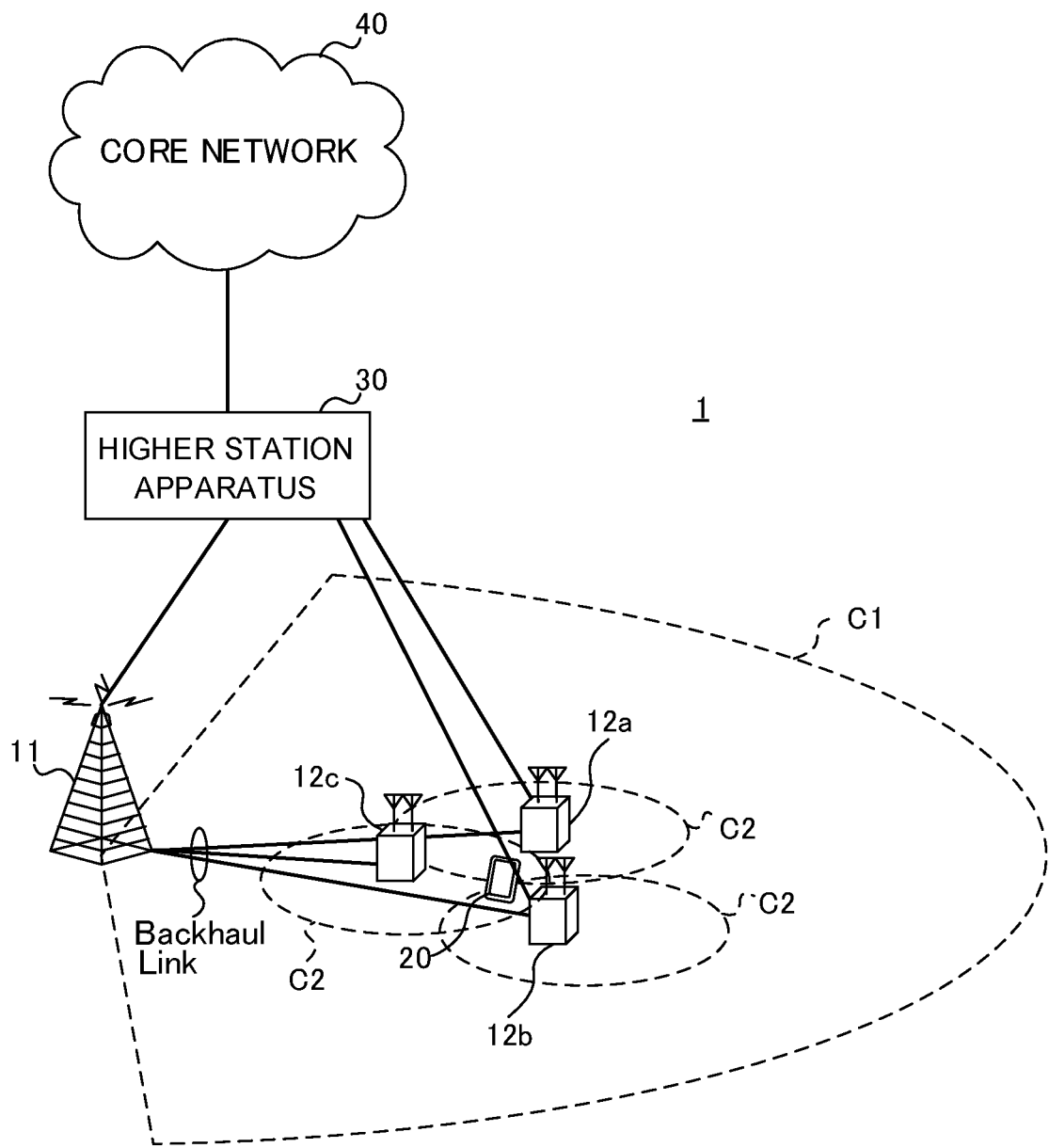
FIG. 15 is a diagram showing an example schematic configuration of a radio communication system according to this embodiment.

FIG. 15 is a diagram showing an example schematic configuration of a radio communication system according to one embodiment of the present invention. A radio communication system 1 can employ carrier aggregation (CA) and/or dual connectivity (DC) that unites a plurality of basic frequency blocks (component carriers) using a system band width (e.g., 20 MHz) for an LTE system as one unit. It should be noted that the radio communication system 1 may also be referred to as SUPER 3G, LTE-Advanced (LTE-A), IMT-Advanced, 4G, 5G, or future radio access (FRA).

The radio communication system 1 in FIG. 15 includes a radio base station 11 that forms a macro cell C1, and radio base stations 12a to 12c that form small cells C2 which are present inside the macro cell C1 and smaller than the macro cell C1. The user terminal 20 exists in the macro cell C1 and the small cells C2. Different numerologies may be used for the cells. It should be noted that numerology refers to a set of communication parameters characterizing a signal design in RAT or a RAT design.

The user terminal 20 can be connected to both the radio base station 11 and the radio base stations 12. The user terminal 20 is assumed to use the macro cell C1 and the small cells C2, which use different frequencies, at the same time by CA or DC. The user terminal 20 may use CA or DC using a plurality of cells (CC) (e.g., six or more CCs). The user terminal can use licensed band CCs and unlicensed band CCs as the plurality of cells. It should be noted that any of the plurality of cells may include a TDD carrier using shortened TTIs.

Communication between the user terminal 20 and the radio base station 11 may use a carrier supporting a narrow bandwidth (referred to as an existing carrier or legacy carrier), in a relatively low frequency band (e.g., 2 GHz). Meanwhile, Communication between the user terminal 20 and each radio base station 12 may use a carrier supporting a wide bandwidth or the same carrier as that between the user terminal 20 and the radio base station 11, in a relatively high frequency band (e.g., 3.5 GHz and 5 GHz) It should be noted that the frequency band used by each radio base station is not limited to this.

The radio base station 11 and each radio base station 12 (or two radio base stations 12) may be wired to each other (e.g., through an optical fiber or X2 interface according to the common public radio interface (CPRI)) or connected wirelessly to each other.

The radio base station 11 and the radio base stations 12 are connected to a higher station apparatus 30 and to a core network 40 via the higher station apparatus 30. Examples of the higher station apparatus 30 include, but should not be limited to, access gateway devices, radio network controllers (RNCs), and mobility management entities (MMEs). Each radio base station 12 may be connected to the higher station apparatus 30 via the radio base station 11.

It should be noted that the radio base station 11 is a radio base station with relatively wide coverage and may be referred to as a macro base station, an aggregate node, an eNodeB (eNB), or a transmit/receive point. It should be noted that the radio base station 12 is a radio base station with local coverage and may be referred to as a small base station, a micro base station, a pico base station, a femto base station, a Home eNodeB (HeNB), a remote radio head (RRH), or a transmit/receive point. When the radio base stations 11 and 12 are not distinguished from each other, they are collectively referred to as a radio base station 10.

Each user terminal 20 supports LTE, LTE-A, and other communication systems and may be a mobile communication terminal or a land-line communication terminal.

In the radio communication system 1 uses orthogonal frequency-division multiple access (OFDMA) as a downlink radio access system, and single carrier-frequency-division multiple access (SC-FDMA) as an uplink radio access system. OFDMA is a multi-carrier transfer system in which the frequency band is divided into a plurality of narrow frequency bands (sub-carriers) and data is mapped to each sub-carrier for communication. SC-FDMA is a single-carrier transfer system in which the system band width is divided into bands each consisting of one or a sequence of resource blocks for each terminal and a plurality of terminals use different bands, thereby reducing an interference between the terminals. It should be noted that the combination of uplink and downlink radio access systems is not necessarily like this and OFDMA may be used for uplink.

In the radio communication system 1, the downlink channels are physical downlink shared channels (PDSCH s) shared among the user terminal 20, physical broadcast channels (PBCHs), and downlink L1/L2 control channels, for example. User data, upper layer control information, system information blocks (SIBs), and the like are transmitted through PUSCHs. Master information blocks (MIBs) are transmitted through PBCHs.

Downlink L1/L2 control channels include physical downlink control channels (physical downlink control channels (PDCCHs), enhanced physical downlink control channels (EPDCCHs)), physical control format indicator channels (PCFICHs), and physical hybrid-ARQ indicator channels (PHICHs). Downlink control information (DCI) including PDSCH and PUSCH scheduling information is transmitted through PDCCHs. The OFDM symbol number used for a PDCCH is transmitted through a PCFICH. Arrival confirmation information (ACK/NACK) related to HARQ for a PUSCH is transmitted through a PHICH. Like a PDCCH, an EPDCCH is subjected to frequency division multiplexing with a physical downlink shared data channel (PDSCH) and used for DCI transmission.

In the radio communication system 1, the uplink channels are physical uplink shared channels (PUSCHs) shared among user terminals 20, and physical uplink control channels (PUCCHs), and physical random access channels (PRACHs), for example. User data and upper layer control information are transmitted through PUSCHs. Uplink control information (UCI) including at least one of arrival confirmation information (ACK/NACK) and radio quality information (CQI) is transmitted through a PUSCH or PUCCH. A random access preamble for establishing connection to a cell is transmitted through a PRACH.

<Radio Base Station>

Figure 16:
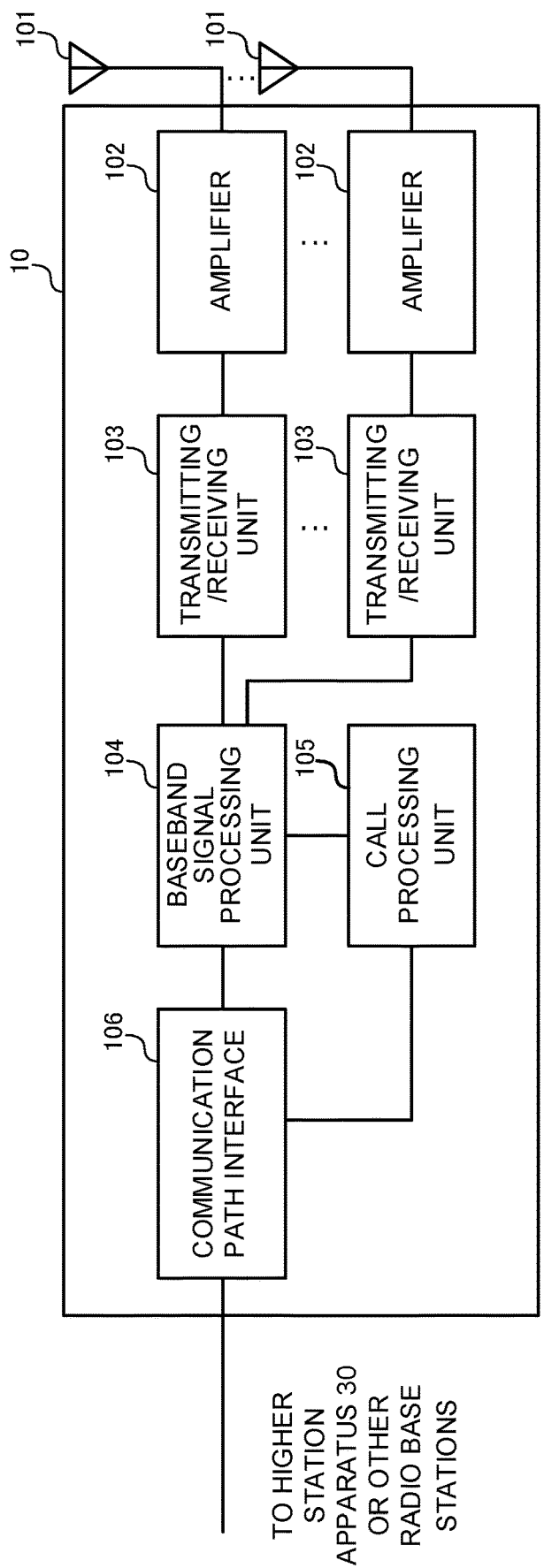
FIG. 16 is a diagram showing an example of the overall configuration of a radio base station according to this embodiment.

FIG. 16 is a diagram showing an example of the overall configuration of a radio base station according to one embodiment of the present invention. The radio base station 10 includes a plurality of transmitting/receiving antennas 101, amplifiers (amplifying sections) 102, transmitting/receiving units (transmitting/receiving sections) 103, a baseband signal processing unit (baseband signal processing section) 104, a call processing unit (call processing section) 105, and a communication path interface 106. It should be noted that each transmitting/receiving unit 103 consists of a transmitting unit and a receiving unit.

User data transmitted from the radio base station 10 to the user terminal 20 through a downlink channel is fed from the higher station apparatus 30 to the base band signal processing unit 104 through the communication path interface 106.

The base band signal processing unit 104 subjects user data to packet data convergence protocol (PDCP) layer processing, user data division/combination, transmission processing for an RLC layer, such as transmission processing for radio link control (RLC) retransmission control, medium access control (MAC) retransmission control (e.g., hybrid automatic repeat request (HARQ) transmission processing), scheduling, transmission format selection, channel coding, inverse fast Fourier transform (IFFT) processing, and pre-coding processing or other transmission processing, and transmits it to each transmitting/receiving unit 103. Downlink control signals are subjected to transmission processing, such as channel coding and inverse fast Fourier transform, and then are transferred to each transmitting/receiving unit 103.

Each transmitting/receiving unit 103 inverts downlink signals, which are pre-coded for each antenna and output from the base band signal processing unit 104, to the radio frequency band. Radio-frequency signals which are frequency-inverted in the transmitting/receiving unit 103 are amplified by the amplifier 102 and then transmitted from the transmitting/receiving antenna 101.

The transmitting/receiving unit (transmitting unit) 103 transmits DL signals (or downlink control information or downlink data) to the user terminal in shortened TTIs. The transmitting/receiving unit (receiving unit) 103 receives UL signals related to the DL transmission. For example, the transmitting/receiving unit (receiving unit) 103 can receive at least one of UL signals related to the DL signals, which are transmitted in every shortened TTI of the TDD carrier, through the other carrier in a predetermined period (see FIG. 8). Each transmitting/receiving unit 103 is a transmitter/receiver, transmitting/receiving circuit, or a transmitting/receiving device based on common understanding within the technical field of the present invention. It should be noted that the transmitting/receiving unit 103 may be a combination transmitting/receiving unit, or a transmitting unit and a receiving unit.

As for uplink signals, radio-frequency signals received at the transmitting/receiving antenna 101 are amplified in the amplifier 102. The transmitting/receiving unit 103 receives uplink signals amplified in the amplifier 102. The transmitting/receiving unit 103 frequency-inverts the received signals to baseband signals and feed them to the baseband signal processing unit 104.

In the base band signal processing unit 104, user data in the received uplink signals is subjected to fast Fourier transform (FFT) processing, inverse discrete Fourier transform (IDFT) processing, error correction decoding, reception processing for MAC retransmission control, and reception processing for RLC layers and PDCP layers, and then transferred to the higher station apparatus 30 through the communication path interface 106. The call processing unit 105 performs call processing, such as communication channel allocation and release, management of the radio base station 10, and management of the radio resource.

The communication path interface 106 transmits/receives signals to/from the higher station apparatus 30 via a predetermined interface. The communication path interface 106 may transmit/receive signals to/from the adjacent radio base station 10 through a base station to base station interface (e.g., an optical fiber or X2 interface according to a common public radio interface (CPRI)) (backhaul signaling).

Figure 17:
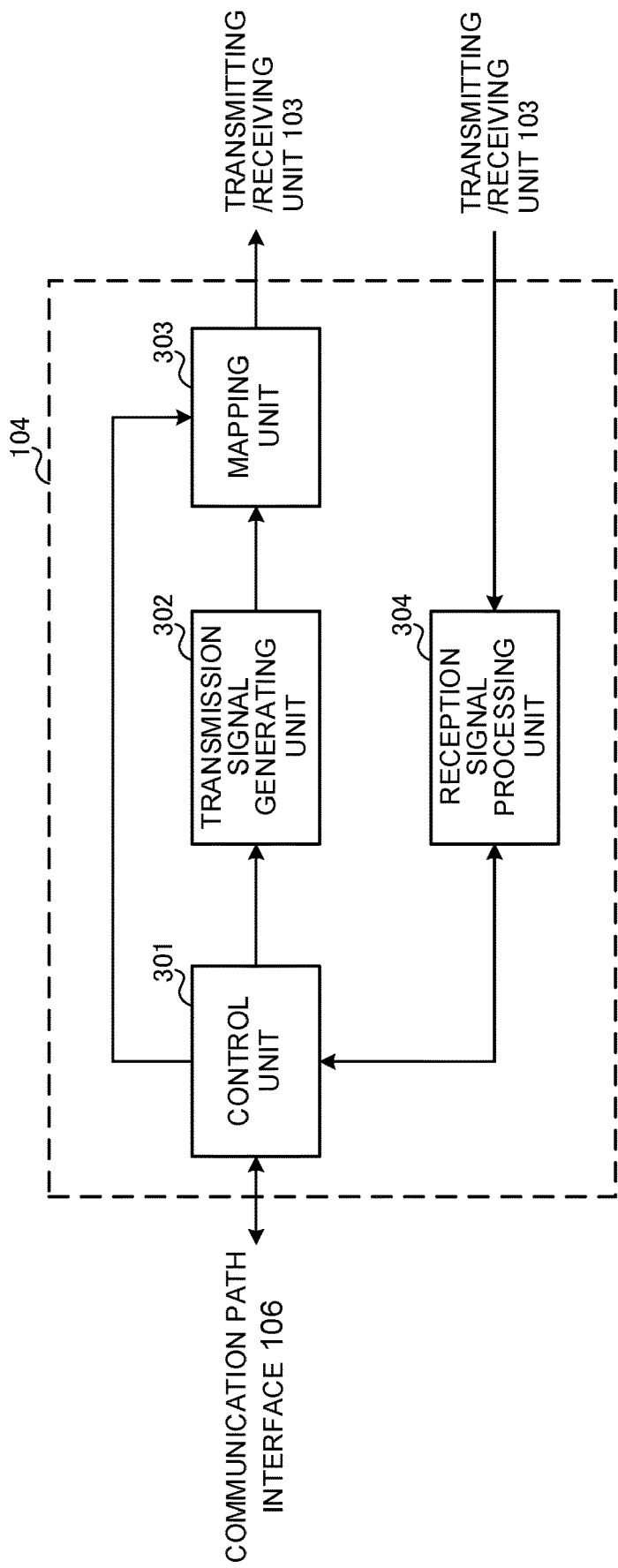
FIG. 17 is a diagram showing an example of the functional structure of a radio base station according to this embodiment.

FIG. 17 is a diagram showing an example of the functional structure of a radio base station according to this embodiment. It should be noted that FIG. 17 mainly shows function blocks which are characteristics of this embodiment, and the radio base station 10 includes other function blocks required for radio communication. As shown in FIG. 17, the baseband signal processing unit 104 includes a control unit (scheduler) 301, a transmission signal generating unit (generating unit) 302, a mapping unit 303, and a reception signal processing unit 304.

The control unit (scheduler) 301 controls scheduling (e.g., resource assignment) for downlink data signals transmitted through a PDSCH and downlink control signals transferred through a PDCCH and/or an EPDCCH. It also controls scheduling for system information, synchronization signals, paging information, cell-specific reference signals (CRSs), channel state information reference signals (CSI-RSs), and the like. It also controls scheduling for uplink reference signals, uplink data signals transmitted through a PUSCH and uplink control signals transferred through a PUCCH and/or a PUSCH.

The control unit 301 can control transmission/reception from/at the transmitting/receiving unit (transmitting unit) 103. For example, the control unit 301 controls reception of uplink control information and uplink data at the user terminal. The control unit 301 can be a controller, a control circuit, or a control device based on common understanding within the technical field of the present invention.

The transmission signal generating unit 302 generates DL signals (including downlink data signals and downlink control signals) in accordance with instructions from the control unit 301 and feeds them to the mapping unit 303. To be specific, the transmission signal generating unit 302 generates downlink data signals (PDSCHs) including user data and feeds them to the mapping unit 303. The transmission signal generating unit 302 also generates downlink control signals (PDCCHs/EPDCCHs) including DCI (UL grant) and feeds them to the mapping unit 303. The transmission signal generating unit 302 also generates downlink reference signals, such as CRSs and CSI-RSs, and feeds them to the mapping unit 303.

The mapping unit 303 maps a DL signal generated in the transmission signal generating unit 302 to a predetermined radio resource in accordance with an instruction from the control unit 301 and feeds the result to the transmitting/receiving unit 103. The mapping unit 303 can be a mapper, a mapping circuit, or a mapping device based on common understanding within the technical field of the present invention.

The reception signal processing unit 304 subjects UL signals (e.g., HARQ-ACK and PUSCHs) transmitted from the user terminal 20 to reception processing (e.g., demapping, demodulation, and decoding). The processing results are fed to the control unit 301. The reception signal processing unit 304 can be a signal processor, a signal processing circuit or a signal processing device, and a measure, a measuring circuit, or a measuring device based on common understanding within the technical field of the present invention.

<User Terminal>

Figure 18:
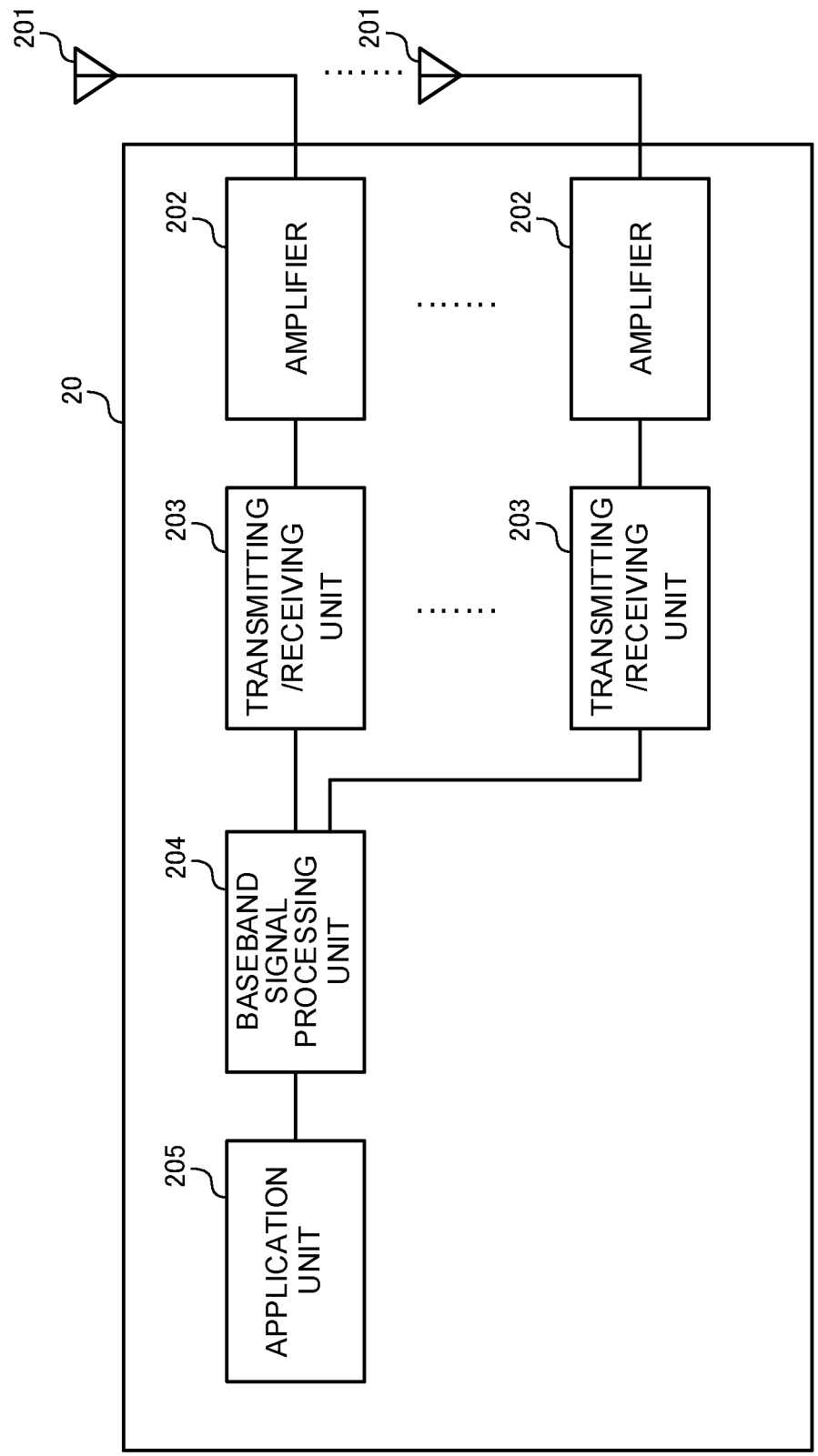
FIG. 18 is a diagram showing an example of the overall configuration of a user terminal according to this embodiment.

FIG. 18 is a diagram showing an example of the overall configuration of the user terminal according to one embodiment of the present invention. The user terminal 20 includes a plurality of transmitting/receiving antennas 201, amplifiers (amplifying sections) 202, transmitting/receiving units (transmitting/receiving sections) 203, a baseband signal processing unit (baseband signal processing section) 204, and an application unit (application section) 205, for MIMO transmission. It should be noted that each transmitting/receiving unit 203 may consist of a transmitting unit and a receiving unit.

Radio-frequency signals received at the plurality of transmitting/receiving antennas 201 are amplified in the respective amplifiers 202. Each transmitting/receiving unit 203 receives downlink signals amplified in the amplifier 202. The transmitting/receiving unit 203 frequency-inverts the received signals to baseband signals and feed them to the baseband signal processing unit 204.

The transmitting/receiving unit (receiving unit) 203 receives DL signals (e.g., downlink control information or downlink data) transmitted from the radio base station. Further, the transmitting/receiving unit (transmitting unit) 203 transmits uplink control information and uplink data related to DL signals. Each transmitting/receiving unit 203 may be a transmitter/receiver, transmitting/receiving circuit, or a transmitting/receiving device based on common understanding within the technical field of the present invention.

The baseband signal processing unit 204 subjects input baseband signals to reception processing, such as FFT processing, error correction decoding, and retransmission control. Downlink user data is transferred to the application unit 205. The application unit 205 performs processing related to layers higher than physical layers and MAC layers. Broadcast information in downlink data is also transferred to the application unit 205.

Meanwhile, uplink user data is input from the application unit 205 to the baseband signal processing unit 204. The baseband signal processing unit 204 performs retransmission control transmission processing (e.g., transmission processing of HARQ), channel coding, pre-coding, discrete Fourier transform (DFT) processing, inverse fast Fourier transform (IFFT) processing, and the like, and the results are transferred to each transmitting/receiving unit 203. Each transmitting/receiving unit 203 inverts a baseband signal, which is output from the base band signal processing unit 204, to a radio-frequency signal and transfers it. The radio-frequency signal which is frequency-inverted by the transmitting/receiving unit 203 is amplified by the amplifier 202 and then transmitted through the transmitting/receiving antenna 201.

Figure 19:
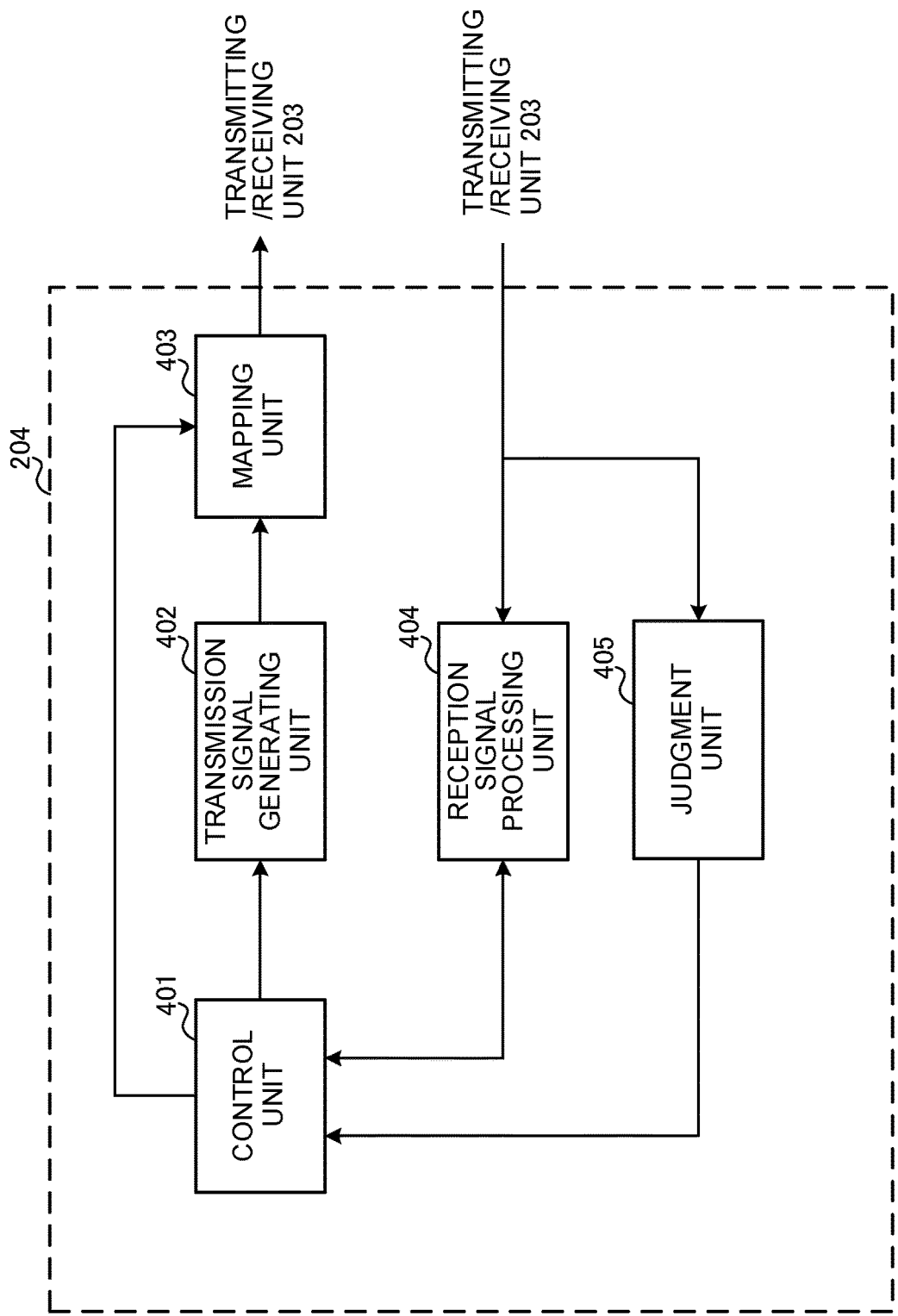
FIG. 19 is a diagram showing an example of the functional configuration of a user terminal according to this embodiment.

FIG. 19 is a diagram showing an example of the functional configuration of a user terminal according to this embodiment. It should be noted that FIG. 19 mainly shows function blocks which are characteristics of this embodiment, and the user terminal 20 includes other function blocks required for radio communication. As shown in FIG. 19, the baseband signal processing unit 204 in the user terminal 20 includes a control unit 401, a transmission signal generating unit 402, a mapping unit 403, a reception signal processing unit 404, and a judgment unit 405.

The control unit 401 acquires downlink control signals (signals transmitted through PDCCHs/EPDCCHs) and downlink data signals (signals transmitted through PDSCHs) from the reception signal processing unit 404. The control unit 401 controls generation of uplink control signals (e.g., arrival confirmation signals (HARQ-ACK)) and uplink data signals on the basis of downlink control signals and the determination of the necessity of retransmission control of each downlink data signal. To be specific, the control unit 401 can control the transmission signal generating unit 402, mapping unit 403, and the reception signal processing unit 404.

The control unit 401 can control at least one of UL signals related to the DL signals, which are transmitted in every shortened TTI of the TDD carrier, through the other carrier in a predetermined period (see FIG. 8). The other carrier may be FDD UL, serving as the pair-band of the TDD, or the other TDD carrier. A UL signal related to a DL signal may be UL data which is transmitted by an instruction given through HARQ-ACK related to the DL signal and/or the DL signal (may include aperiodic CSI).

The control unit 401 can determine which UL signal is transmitted through the other carrier on the basis of the shortened TTI in which the DL signal is received through the TDD carrier, and the UL transmission period in the TDD carrier and/or the UL transmission period in the other carrier. Alternatively, the control unit 401 may determine through which carrier the UL signal is transmitted, on the basis of control information contained in the DL signal from the TDD carrier.

The control unit 401 can transmit part of a UL signal, which is related to a DL signal from the TDD carrier, through the other carrier, and the other UL signal through an UpPTS contained in a UL subframe and/or special subframe of the TDD carrier (see FIGS. 9 and 10).

To transmit the other UL signal by using an UpPTS contained in a special subframe, the control unit 401 can use a new PUCCH format (new PUSCH configuration) and/or a special subframe configuration including an UpPTS of three or more symbols (see FIGS. 11 and 13).

Figure 14:
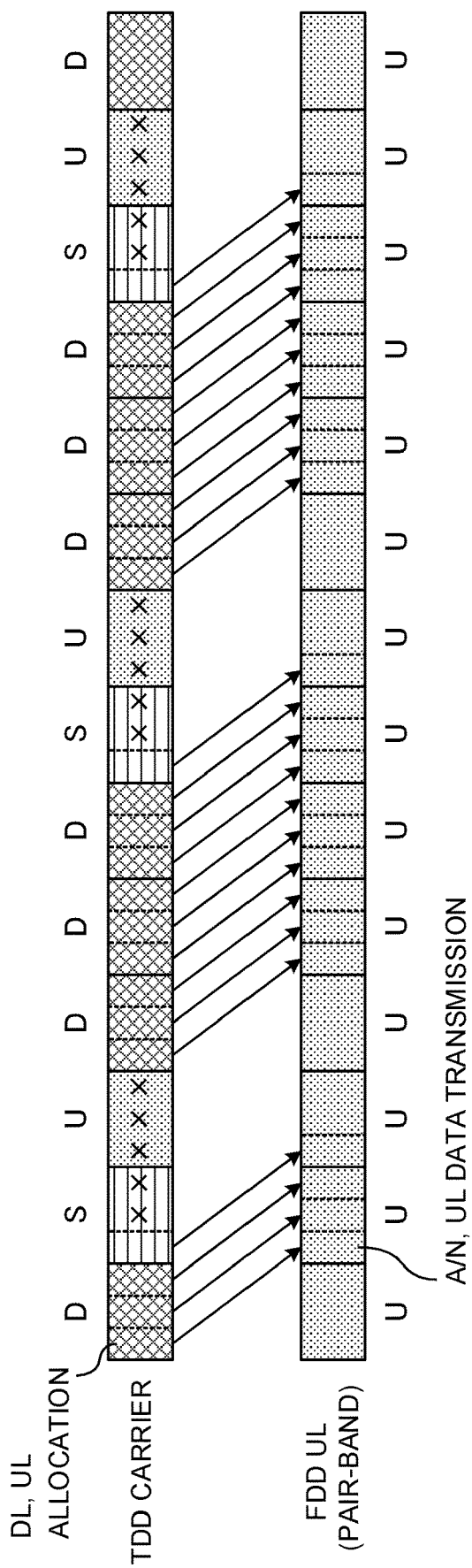
FIG. 14 is a diagram showing another example of UL transmission control according to this embodiment.

When the other carrier is a TDD carrier different from the TDD carrier and no UL resource exists in the other TDD carrier when a UL signal related to a DL signal of the TDD carrier is transmitted, the control unit 401 can transmit the UL signal related to the DL signal of the TDD carrier during a transmission time longer than the predetermined time (see FIG. 14).

The control unit 401 can be a controller, a control circuit, or a control device based on common understanding within the technical field of the present invention.

The transmission signal generating unit 402 generates UL signals in accordance with instructions from the control unit 401 and feeds them to the mapping unit 403. For example, the transmission signal generating unit 402 generates uplink control signals, such as arrival confirmation signals (HARQ-ACK) and channel state information (CSI)), in accordance with instructions from the control unit 401.

The transmission signal generating unit 402 generates uplink data signals in accordance with instructions from the control unit 401. For example, the control unit 401 instructs the transmission signal generating unit 402 to generate an uplink data signal when the downlink control signal received from the radio base station 10 includes a UL grant. The transmission signal generating unit 402 can be a signal generator, a signal generating circuit, or a signal generating device based on common understanding within the technical field of the present invention.

The mapping unit 403 maps an uplink signal (an uplink control signal and/or uplink data) generated in the transmission signal generating unit 402 to a radio resource in accordance with an instruction from the control unit 401 and feeds the result to the transmitting/receiving unit 203. The mapping unit 403 can be a mapper, a mapping circuit, or a mapping device based on common understanding within the technical field of the present invention.

The reception signal processing unit 404 subjects DL signals (e.g., downlink control signals transmitted from a radio base station and downlink data signals transmitted through PDSCHs) to reception processing (e.g., demapping, demodulation, and decoding). The reception signal processing unit 404 feeds information, which is transmitted from the radio base station 10, to the control unit 401 and the judgment unit 405. The reception signal processing unit 404 feeds, for example, broadcast information, system information, RRC signaling, and DCI to the control unit 401.

The reception signal processing unit 404 can be a signal processor, a signal processing circuit or a signal processing device, and a measure, a measuring circuit, or a measuring device based on common understanding within the technical field of the present invention. The reception signal processing unit 404 may be a receiving unit according to the present invention.

The judgment unit 405 performs retransmission control judgement (ACK/NACK) based on the decoding results provided by the reception signal processing unit 404, and feeds the judgement to the control unit 401. When multiple CCs (for example, six or more CCs) transmit downlink signals (PDSCHs), each CC is subjected to retransmission control judgement (ACK/NACK) and can be fed to the control unit 401. The judgment unit 405 can be a judgement circuit or a judgement device based on common understanding within the technical field of the present invention.

(Hardware Configuration)

It should be noted that the block diagrams used for describing the aforementioned embodiments show one function as one block. These function blocks (configuration parts) are achieved by a given combination of hardware and/or software. Each function block can be achieved by any means. In particular, each function block may be achieved by physically combined one device or multiple devices, specifically, two or more physically separated devices wired or connected wirelessly.

Figure 20:
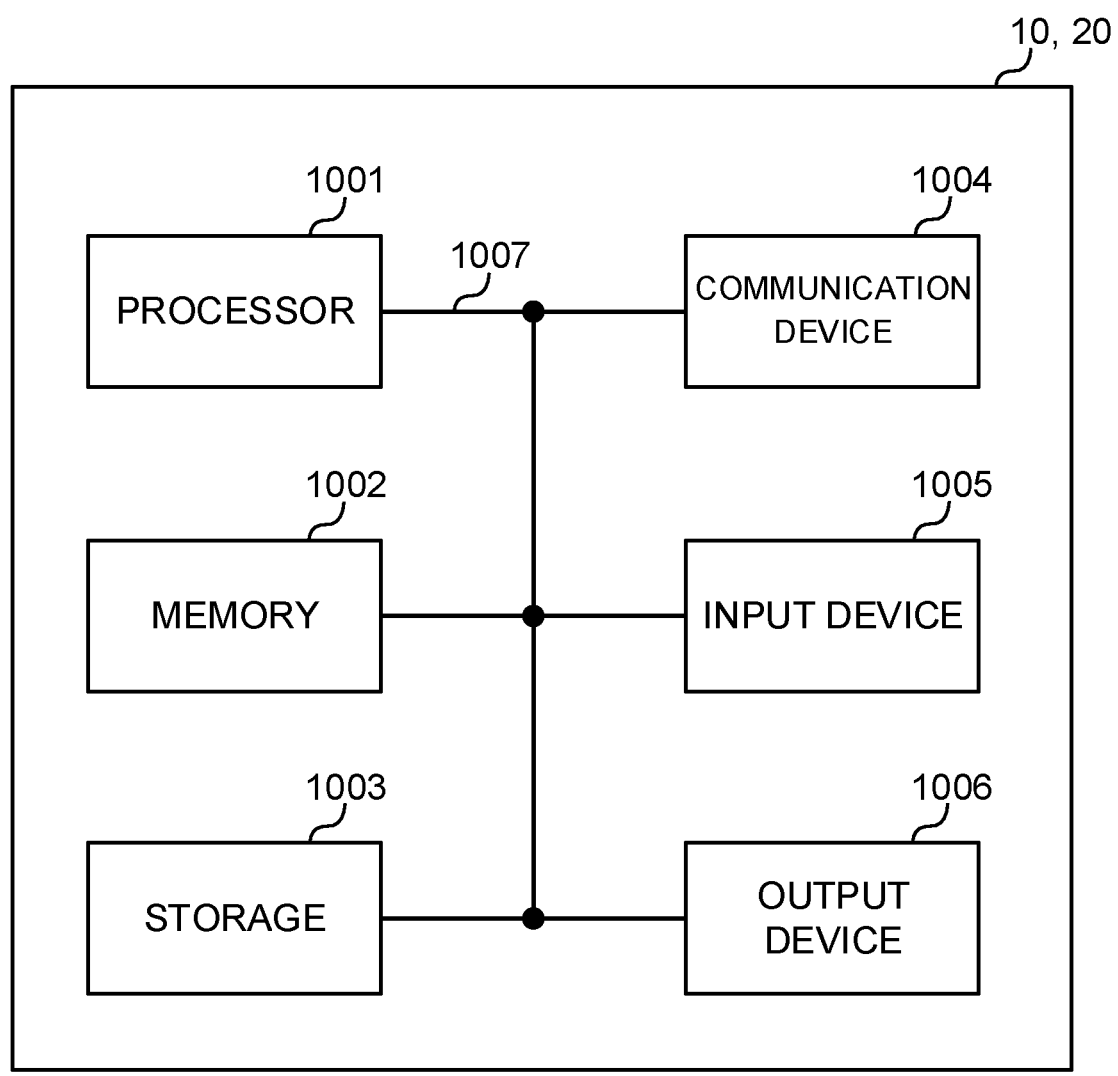
FIG. 20 is a diagram showing an example of the hardware configuration of a radio base station and a user terminal according to one embodiment of the present invention.

For example, a radio base station, a user terminal, and other components according to one embodiment of the present invention may function as a computer for processing in a radio communication method of the present invention. FIG. 20 is a diagram showing an example of the hardware configuration of a radio base station and user terminal according to one embodiment of the present invention. The aforementioned radio base station 10 and the user terminal 20 may be physically configured as a computer device including a processor 1001, a memory 1002, a storage 1003, a communication device 1004, an input device 1005, an output device 1006, and a bus 1007.

In the description below, the term "device" can be replaced with circuit or unit. The hardware configuration of the radio base station 10 and the user terminal 20 may include one or more devices shown in the drawings or include not all these devices.

The functions of the radio base station 10 and the user terminal 20 are composed of the processor 1001, the memory 1002, and other hardware installed with predetermined software (programs) and achieved by the fact that the processor 1001 performs computation, the communication device 1004 provides communication, and data reading and/or writing in the memory 1002 and the storage 1003 is controlled.

The processor 1001 entirely controls the computer by operating, an operating system. The processor 1001 may be a central processing unit (CPU) including an interface with peripheral devices, a control device, a computing device, and a register. For example, the aforementioned baseband signal processing unit 104 (204), the call processing unit 105, and other units may be achieved by the processor 1001.

The processor 1001 reads programs (program codes), software modules, and data from the storage 1003 and/or the communication device 1004 and sends them to the memory 1002, and various processing is carried out in accordance with them. The programs are programs for instructing the computer to carry out at least part of the operations explained in the aforementioned embodiments. For example, the control unit 401 in the user terminal 20 may be achieved by control programs which are stored in the memory 1002 and operate with the processor 1001. The other function blocks may also be operated in the same manner.

The memory 1002 is a computer-readable recording medium, for example, at least one of read only memory (ROM), erasable programmable ROM (EPROM), and random access memory (RAM). The memory 1002 may also be referred to as a register, cash, or main memory (main storage device). The memory 1002 can store programs (program codes), software modules, and the like that can be executed for implementing a radio communication method according to one embodiment of the present invention.

The storage 1003 may be a computer-readable recording medium, for example, at least one of compact disc ROM (CD-ROM) or other optical discs, hard disc drives, flexible discs, magneto-optical discs, flash memory. The storage 1003 may also be referred to as an auxiliary memory device.

The communication device 1004 is hardware (transmission/reception device) for communication between computers via wires and/or a radio network, e.g., a network device, a network controller, a network card, or a communication module. For example, the aforementioned transmitting/receiving antenna 101 (201), amplifier 102 (202), transmitting/receiving unit 103 (203), communication path interface 106, and the like may be achieved by the communication device 1004.

The input device 1005 is an input device receiving inputs from external devices (e.g., keyboard and mouse). The output device 1006 is an output device producing outputs to external devices (e.g., display and speaker). It should be noted that the input device 1005 and the output device 1006 may be integrated into one piece (e.g., touchscreen).

The processor 1001, the memory 1002, and other devices are connected to each other by the bus 1007 for information communication. The bus 1007 may be a single bus or different buses for different devices.

The radio base station 10 and the user terminal 20 may include a microprocessor, a digital signal processor (DSP), an application specific integrated circuit (ASIC), a programmable logic device (PLD), a field programmable gate array (FPGA), and other hardware, and part or all of each function block may be achieved by the hardware. For example, the processor 1001 may contain at least one of these pieces of hardware.

It should be noted that terms described in this specification and/or the terms necessary for understanding of this specification may be replaced with terms having the same or similar meanings. For example, "channel" and/or "symbol" may be replaced with "signal (signaling)". "Signal" may be replaced with "message". "Component carrier (CC)" may be referred to as "cell", "frequency carrier", or "carrier frequency".

A radio frame may consist of one or more periods (frames) in the time domain. The at least one or more periods (frames) forming the radio frame may be referred to as "subframe". A subframe may consist of one or more slots in the time domain. A slot may consist of one or more symbols (e.g., OFDM symbols and SC-FDMA symbols) in the time domain.

A radio frame, a subframe, a slot, and a symbol represent time units during signal transmission. A radio frame, a subframe, a slot, and a symbol may have alternative names. For example, one subframe may be referred to as a transmission time interval (TTI), a sequence of subframes as a TTI, and one slot as a TTI. To be specific, a subframe or TTI may be a subframe (1 ms), a period shorter than 1 ms (e.g., 1 to 13 symbols), or a period longer than 1 ms in existing LTE.

Here, a TTI refers to, for example, a minimum time unit in scheduling for radio communication. For example, in an LTE system, a radio base station performs scheduling for TTI-based assignment of a radio resource (e.g., a frequency band width or transmission power that can be used for each user terminal) to each user terminal. It should be noted that the definition of TTI is not limited to this.

A resource block (RB) is a resource assignment unit in the time domain and the frequency domain and may include a sequence of one or more sub-carriers in the frequency domain. An RB may include one or more symbols in the time domain and may have a length of one slot, one subframe, or one TTI. One TTI and one subframe may each consist of one or more resource blocks. It should be noted that an RB may be referred as, for example, a physical resource block (physical RB or PRB), a PRB pair, and an RB pair.

A resource block may consist of one or more resource elements (REs). For example, one RE may be a radio resource of one sub-carrier and one symbol.

It should be noted that the aforementioned configurations of radio frame, subframe, slot, and symbol are illustrative only. For example, the number of subframes included in a radio frame, the number of slots included in a subframe, the number of symbols and RBs included in a slot, the number of sub-carries included in an RB, and the number of symbols in a TTI, the symbol length, and the cyclic prefix (CP) length can be variously modified.

Information and parameters described in this specification may be represented by absolute values, values relative to predetermined values, or other corresponding information. For example, a radio resource may be indicated by a predetermined index.

Information and signals described in this specification may be expressed by any of different techniques. For example, data, instructions, commands, information, signals, bits, symbols, and chips mentioned throughout the above description may be represented by voltage, current, electromagnetic waves, magnetic fields or magnetic particles, optical fields or photons, or any combination thereof.

Software, instructions, and information may be transmitted and received via a transmission medium. For example, when software is transmitted from websites, servers, or other remote sources through wire connection technology (coaxial cables, optical fiber cables, twisted pair cables and digital subscriber line (DSL)) and/or wireless (radio) technology (e.g., infrared rays and microwaves), the wire connection technology and/or the wireless technology is contained in the definition of a transmission medium.

A radio base station in this specification may be replaced with user terminal. For example, the embodiments of the present invention may be applied to a configuration in which communication between a radio base station and a user terminal is replaced with device-to-device (D2D) communication between a plurality of user terminal pieces. In this case, the user terminal 20 may have the same function as the radio base station 10. The terms "uplink" and "downlink" may be replaced with "side". For example, "uplink channel" may be replaced with "side channel".

Similarly, the user terminal in this specification may be replaced with a radio base station. In this case, the radio base station 10 may have the same function as the user terminal 20.

The embodiments in this specification can be used alone or in combination or can be switched in actual use. In addition, predetermined information notification (e.g., the notification "being X") is performed not only explicitly but also implicitly (e.g., by not performing this predetermined information notification).

Information notification is not necessarily performed by the methods explained in the embodiments in this specification and may be performed by any other methods. For example, information notification may be performed by physical layer signaling (e.g., downlink control information (DCI), uplink control information (UCI)), higher-layer signaling (e.g., radio resource control (RRC) signaling, broadcast information (master information block (MIB), and system information block (SIB)), and medium access control (MAC) signaling), or other signals, or any combination thereof. RRC signaling may be referred to as an RRC message and may be, for example, an RRC connection setup message, an RRC connection reconfiguration message, or the like. MAC signaling may be sent through, for example, a MAC control element (MAC control element (CE)).

The embodiments described in this specification may be applied to systems using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), New-radio access technology (RAT), CDMA2000, ultra mobile broadband (UMB), IEEE 802.11 (Wi-Fi(registered trademark)), IEEE 802.16 (WiMAX (registered trademark)), IEEE 802.20, ultra-wideband (UWB), Bluetooth (registered trademark), and other appropriate radio communication methods, and/or next-generation systems extended based on them.

The processes, sequences, and flow charts according to the embodiments in this specification may be changed in a consistent way. For example, the methods described in this specification suggests various steps in an illustrative order and does not exclusively suggest this particular order.

The present invention has been described in detail but it is clear to those skilled in the art that the present invention should not be limited to the embodiments described in this specification. For example, these embodiments may be used alone or in combination. The present invention can be implemented in the forms of embodiments amended or modified without departing from the spirit and scope of the invention defined by Claims. Therefore, the description in this specification is used for giving examples and does not impose any limits to the present invention.

This application claims priority to Japanese Patent Application No. 2016-013685 filed on Jan. 27, 2016 which is herein incorporated by reference.

The invention claimed is:

1. A terminal comprising:
a receiver that receives downlink control information for scheduling of an uplink shared channel, in a first carrier for time division duplex, the downlink control information including a bit field that indicates a carrier used for transmission of the uplink shared channel;
a processor that determines, based on the downlink control information, the carrier from the first carrier and another uplink carrier that is not used for a downlink; and
a transmitter that transmits the uplink shared channel by using the determined carrier,
wherein a length of a slot in the first carrier is shorter than a length of a slot in the another uplink carrier.

2. The terminal according to claim 1, wherein the receiver receives higher layer signaling that indicates the another uplink carrier.

3. The terminal according to claim 2, wherein a subcarrier spacing in the first carrier is greater than a subcarrier spacing in the another uplink carrier.

4. The terminal according to claim 2, wherein the another uplink carrier is not used to pair with a carrier for downlink for frequency division duplex, and is used to pair with the first carrier.

5. The terminal according to claim 1, wherein a subcarrier spacing in the first carrier is greater than a subcarrier spacing in the another uplink carrier.

6. The terminal according to claim 1, wherein the another uplink carrier is not used to pair with a carrier for downlink for frequency division duplex, and is used to pair with the first carrier.

7. A radio communication method for a terminal:
receiving downlink control information for scheduling of an uplink shared channel, in a first carrier for time division duplex, the downlink control information including a bit field that indicates a carrier used for transmission of the uplink shared channel;
determining, based on the downlink control information, the carrier from the first carrier and another uplink carrier that is not used for a downlink; and
transmitting the uplink shared channel by using the determined carrier,
wherein a length of a slot in the first carrier is shorter than a length of a slot in the another uplink carrier.

8. A base station comprising:
a processor that determines a carrier used for transmission of an uplink shared channel, from a first carrier that is used for time division duplex and another uplink carrier that is not used for a downlink;
a transmitter that transmits downlink control information for scheduling of an uplink shared channel, in the first carrier, the downlink control information including a bit field that indicates the determined carrier; and
a receiver that receives the uplink shared channel in the determined carrier,
wherein a length of a slot in the first carrier is shorter than a length of a slot in the another uplink carrier.

9. A system comprising a terminal and a base station, wherein:
the terminal comprises:
a receiver of the terminal that receives downlink control information for scheduling of an uplink shared channel, in a first carrier for time division duplex, the downlink control information including a bit field that indicates a carrier used for transmission of the uplink shared channel;
a processor of the terminal that determines, based on the downlink control information, the carrier from the first carrier and another uplink carrier that is not used for downlink; and
a transmitter of the terminal that transmits the uplink shared channel by using the determined carrier, and
the base station comprises:
a processor of the base station that determines the carrier used for transmission of the uplink shared channel, from the first carrier and the another uplink carrier;
a transmitter of the base station that transmits the downlink control information in the first carrier; and
a receiver of the base station that receives the uplink shared channel in the determined carrier,
wherein a length of a slot in the first carrier is shorter than a length of a slot in the another uplink carrier.

* * * * *